United States Patent
Chen et al.

(10) Patent No.: US 8,411,942 B2
(45) Date of Patent: Apr. 2, 2013

(54) METHOD AND APPARATUS FOR HYBRID IMAGE COMPRESSION

(75) Inventors: Yu-Ling Chen, Epping (AU); David Robert James Monaghan, Botany (AU); Ian Geoffrey Combes, Roselands (AU); James Philip Andrew, Waverton (AU); Peter William Mitchell Ilbery, Dundas (AU); Anthony John Arnold, Roseville (AU); Dixon De Sheng Deng, East Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 1082 days.

(21) Appl. No.: 11/947,550

(22) Filed: Nov. 29, 2007

(65) Prior Publication Data
US 2008/0144952 A1    Jun. 19, 2008

(30) Foreign Application Priority Data
Nov. 30, 2006    (AU) ................................ 2006246497

(51) Int. Cl.
G06K 9/36    (2006.01)
G06K 9/46    (2006.01)

(52) U.S. Cl. ........................................ 382/166; 382/243
(58) Field of Classification Search .................... 382/16, 382/240, 243–247
See application file for complete search history.

(56) References Cited

U.S. PATENT DOCUMENTS

| | | | |
|---|---|---|---|
| 5,638,498 A | 6/1997 | Tyler et al. ..................... 395/117 |
| 5,778,092 A | 7/1998 | MacLeod et al. ............. 382/176 |
| 5,982,937 A | 11/1999 | Accad ............................ 382/239 |
| 6,163,625 A | 12/2000 | Ng et al. ......................... 382/239 |
| 6,246,798 B1 | 6/2001 | Andrew et al. ................ 382/240 |
| 6,259,819 B1 | 7/2001 | Andrew et al. ................ 382/248 |
| 6,263,110 B1 | 7/2001 | Andrew et al. ................ 382/232 |
| 6,266,414 B1 | 7/2001 | Bradley et al. ................ 380/240 |
| 6,324,305 B1 | 11/2001 | Holladay et al. .............. 382/239 |
| 6,330,362 B1 | 12/2001 | Venkateswar .................. 382/232 |
| 6,330,363 B1 | 12/2001 | Accad ........................... 382/232 |
| 6,351,568 B1 | 2/2002 | Andrew ......................... 382/239 |
| 6,373,583 B1 | 4/2002 | Wood et al. ................... 358/1.14 |
| 6,570,510 B2 | 5/2003 | Chen et al. ...................... 341/51 |
| 6,606,416 B1 | 8/2003 | Yip et al. ....................... 382/240 |
| 6,664,902 B2 | 12/2003 | Andrew et al. ................. 341/50 |
| 6,683,991 B1 | 1/2004 | Andrew et al. ................ 382/240 |
| 6,728,752 B1* | 4/2004 | Chen et al. ..................... 709/203 |
| 6,763,139 B1 | 7/2004 | Andrew ......................... 382/240 |
| 6,804,402 B2 | 10/2004 | Andrew ......................... 382/240 |
| 6,891,895 B1 | 5/2005 | Onno et al. .................... 375/260 |
| 6,947,874 B2 | 9/2005 | Chen ............................. 702/189 |
| 6,980,693 B2 | 12/2005 | Horie ............................ 382/232 |
| 6,999,626 B2 | 2/2006 | Andrew ......................... 382/235 |

(Continued)

OTHER PUBLICATIONS

Bertalmio et al. ("Image Inpainting," ACM SIGGRAPH 2000, Jul. 2000, pp. 417-424).*

Primary Examiner — Yubin Hung
(74) Attorney, Agent, or Firm — Fitzpatrick, Cella, Harper & Scinto

(57) ABSTRACT

A Hybrid Compressor and method of compressing a tile of pixels within an image are disclosed. An Edge Processor of the Hybrid Compressor analyzes pixel runs of the tile and generates boundary data defining one or more regions comprising pixels of substantially identical color. A Palette Processor of the Hybrid Compressor generates data defining a color value for each region. An Image Processor of the Hybrid Compressor generates a representation of pixels not included in the one or more regions.

16 Claims, 26 Drawing Sheets

U.S. PATENT DOCUMENTS

| | | | |
|---|---|---|---|
| 7,003,167 B2 | 2/2006 | Mukherjee | 382/239 |
| 7,072,571 B2 | 7/2006 | Suzuki | 386/68 |
| 7,088,866 B2 | 8/2006 | Andrew | 382/233 |
| 7,110,608 B2 | 9/2006 | Chan et al. | 382/239 |
| 7,197,190 B1 | 3/2007 | Andrew | 382/240 |
| 7,212,678 B2 | 5/2007 | Brown et a | 382/240 |
| 7,277,489 B1 | 10/2007 | Andrew | 375/240.19 |
| 7,308,146 B2 | 12/2007 | Becker et al. | 382/233 |
| 2002/0041716 A1* | 4/2002 | Bruna et al. | 382/250 |
| 2003/0133617 A1 | 7/2003 | Mukherjee | 382/239 |
| 2004/0032968 A1 | 2/2004 | Andrew et al. | 382/100 |
| 2005/0100229 A1 | 5/2005 | Becker et al. | 382/232 |
| 2007/0206012 A1 | 9/2007 | Combes et al. | 345/441 |

* cited by examiner

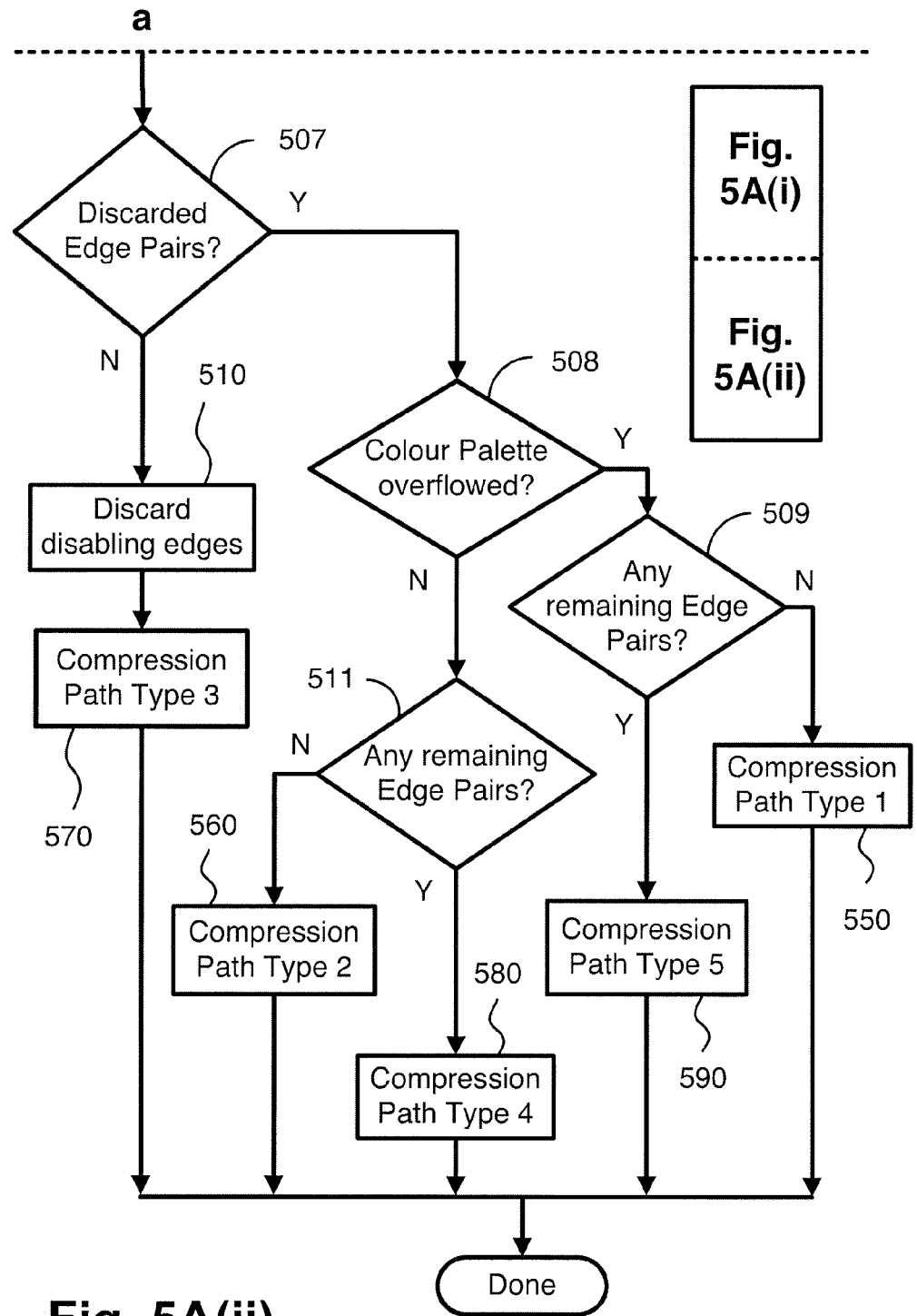
Fig. 5A(ii)

METHOD AND APPARATUS FOR HYBRID IMAGE COMPRESSION

FIELD OF THE INVENTION

The present invention relates generally to document compression and, in particular, to the compression of continuous-tone compound documents containing an arbitrary combination of text, graphics and photographic images.

DESCRIPTION OF BACKGROUND ART

Raster Image Processing is the process and the means of turning vector digital information, such as an Adobe® PostScript® file, into a high-resolution raster image. The Raster Image Processor (RIP) takes the digital information about fonts and graphics that describes the appearance of a document and translates the information into an image composed of individual pixels that the imaging device such as a printer can output. A number of types of Raster Image Processors are known to the art. These include frame-store RIP's, band-store RIP's and tile-order RIP's.

In the tile RIP, the page is divided up into square tiles. Each tile is fully rendered before the RIP starts rendering the next tile. With such a RIP, the RIP output compressor may start compression of a rendered tile as soon as it is available, provided that the compressor can accept data in tile order.

Pixel data generated by a RIP can belong to a number of different region types namely text, graphic, pattern and image regions. Each region type has different characteristics and hence compression requirements. Pixels that form characters, symbols and other glyphs are referred to as text regions. Pixels that form large regions of the same colour as evident in many block diagrams, charts and clip art are referred to as graphic regions. Text regions and graphic regions both contain a single colour per region and require the transitions between regions to be defined accurately in order to maintain sharp edges. Pattern regions are pixels that contain a regular or random pattern of small dots or blobs to simulate a shading effect. They typically only use 2 colours, but contain many sharp transitions in colour. Due to the very small size and spacing of the dots, it is not particularly critical to retain this information exactly. The effect that is created by the dots takes advantage of the human eye's tendency to average fine detail. Image regions contain many colours per region which vary more smoothly than the transitions between colours in graphic or text regions. These regions contain a large quantity of data due to the constantly changing colours within the region.

A common practice is to compress the RIP output to reduce the amount of memory required and hence the cost of hardware in a printing device. Many methods with various advantages and disadvantages have been suggested to achieve this compression. When choosing a compression method, it is important to use a method that is appropriate for the type of data being compressed. These methods can broadly be categorized as either lossy or lossless.

One class of lossy RIP output compression algorithms is the pixel-based methods, such as JPEG and wavelet compression. These algorithms are able to achieve high compression ratios by discarding information that is not visually significant. This achieves good compression ratios and acceptable visual quality for natural images, however, documents containing sharp transitions in colour such as basic text or graphics can suffer from the introduction of visible artifacts.

The majority of lossless compression algorithms can be broadly categorized as pixel-based or edge-based. Lossless pixel-based methods such as JPEG-LS suffer from the same drawbacks as lossy pixel-based methods. As resolution and colour depth increases, these algorithms become prohibitively memory expensive. The advantage of lossless compression is that the output is of high quality. This is important for text and graphic regions where sharp transitions in colour must be maintained and the sort of artifacts caused by most lossy algorithms avoided. The disadvantage of lossless compression is that worst-case jobs will cause the compressed size to be larger than the raw size.

Edge-based (vector-based) algorithms are generally lossless and therefore preserve sharp transitions in colour. Text regions and graphic regions contain a single colour and can therefore be represented very efficiently using edge-based algorithms since a large area of many pixels can be described with only a single edge. These algorithms are less affected by increases in resolution or bit depth since the number of edges does not increase as the resolution increases. However, natural images do not compress well with edge-based algorithms and may even cause the compressed size to be larger than the raw size.

Pattern data can be effectively coded by some lossless, pixel-based methods that use predictive coding. This is true if the pattern is uniform, however, pattern regions that contain random patterns result in a poor compression ratio.

No lossy or lossless method alone produces a satisfactory outcome for the compression of RIP output which can contain a wide variety of different requirements across a single page. A combination or hybrid of lossless and lossy methods is one way to achieve better results.

The lossless method preserves the sharp colour transitions while the lossy method provides strong compression of regions with many colours. This can be an effective method of gaining high compression while maintaining high quality. This requires some method of identifying which regions should be encoded losslessly and which should be encoded lossily.

Usually, lossless encoding is used for flat regions. Flat regions are text or graphics regions which typically consist of a single colour which is outlined by a sharp edge at page resolution.

Usually, lossy encoding is used for regions of pixels that form a photographic image. These image regions contain a wide variety of colours that typically do not change markedly from one pixel to the next. The boundary of an image region must still be retained accurately since the human visual system will treat the boundary between an image region and a flat region much the same as the boundary between two flat regions. However, the pixels within an image region do not need to be preserved exactly since the human visual system is less sensitive to small variations in colour or luminance within an image region.

Pattern data may be compressed with either a lossy or a lossless method. The decision of which method to use is usually based on analysing the performance of the chosen lossy and lossless algorithms when compressing pattern data.

One method of applying a combination of lossy and lossless compression is to analyse blocks of pixels (usually tiles) and choose the most appropriate method for each block. This method has some advantages over just using a single compression method for the whole page, but it can still cause visible artefacts since many blocks will contain a mixture of flat and image regions.

In order to solve this problem, the Mixed Raster Content standard (MRC) (ITU recommendation T.44) outlines a standard way of defining the pixel type of each pixel in mixed-raster content documents (documents containing flat regions and photographic images). The page is split into three planes to allow a lossless and lossy compression method to be applied to two of the planes while the third plane is used as a binary mask to select between the first two planes. Unfortunately, no provisions are made for detecting text with background images or for the presence of text within images. Furthermore, the document background basically must be white or bright. These are unsatisfactory constraints for RIP output compression.

The cost of memory required to store the RIP output is a critical factor in the overall cost of a printing system. While it has already been stated that RIP output compression is necessary, a further requirement is that the maximum size of the compressed output is fixed so that hardware costs can be kept low. In other words, it is important to use a compression algorithm characterised as guaranteed fit. One approach to achieving guaranteed fit is to compress the image multiple times, increasing the compression strength successively until the data fits in the fixed output. For this method, the complete page must be held in memory before compression. Then, if the fixed memory size is exceeded, the page is recompressed with different settings until the image fits in the allocated memory. This method does not reduce memory requirements since the complete RIP output is being stored prior to compression. Also, this method can be expensive in processing time if multiple compression passes are required.

U.S. Pat. No. 5,638,498 (Tyler, et. al.) granted Jun. 10, 1997 discloses a method and apparatus for reducing storage requirements for display data. Data objects to be displayed are organized into display lists and each data object includes an object type, such as text, graphic, and image. The data objects are rasterised into an uncompressed band buffer and divided into non-intersecting bitmap regions each identified with one or more object types. Each non-empty region is assigned a compression algorithm dependent upon the type of the region and specified compression constraints. The regions are combined with each other into larger regions if appropriate, and each region is compressed using its assigned compression algorithm into a compressed band buffer, thus reducing the required storage space for the data objects. The compressed data is decompressed in scan line order with a selected decompression algorithm corresponding to the assigned compression algorithms to produce uncompressed output data. The uncompressed output data is supplied to an output display device for display. However, the method used to define the regions is based on an object level assessment and not a pixel level assessment of the region. This method suffers from being a coarse method of selecting the compression method. Pixel based selection method allows a much finer granularity.

U.S. Pat. No. 6,324,305 (Holladay, et. al.) granted Nov. 27, 2001 and U.S. Pat. No. 6,330,362 (Venkateswar) granted Dec. 11, 2001 disclose methods of compressing multi-level screened images. In particular, a method is disclosed of compressing a colour or gray scale pixel map representing a document using an MRC format including a method of segmenting an original pixel map into two planes, and then compressing the data of each plane in an efficient manner. The image is segmented such that pixels that compress well under a lossy compression technique are placed on one plane and pixels that must be compressed losslessly are placed on another plane. Lossy compression is then applied to the lossy pixel plane while lossless compression is applied to the lossless pixel plane. It suffers from the requirement to losslessly encode the binary image selection plane as metadata in order to reconstruct the image leading to an increase in memory resources. The methods described also increase the quantization of image regions depending on remaining memory resource. These methods have a number of weaknesses. Firstly, the compression factor may vary across the page, resulting in areas of different visual quality. Secondly, areas of low complexity will utilise too much memory, while areas of high complexity will not have enough memory available when needed. Thirdly, the aim of these methods is to fill a set memory size, so even simple pages will require a large amount of memory.

U.S. Pat. No. 5,982,937 (Accad) granted Nov. 9, 1999 discloses an apparatus and method for hybrid compression of raster data. Patches of connected pixels of the same colour are identified. Patches of at least a predetermined sized, typically corresponding to text or line art objects, are subjected to a lossless compression. Patches below the predetermined size, typically corresponding to image or photo objects, are substantially subjected to a lossy compression. The patch predetermined size controls the mix of lossless and lossy compression procedures. Optimum compression is achieved by maximizing the lossless compression while attaining a targeted compression ratio. Various features include efficient recognition and encoding of patches, refined treatment of the boundaries between the lossless- and the lossy-compressed pixels, adaptive compression ratio control, and fail-safe compression provisions. Rate control is achieved by varying compression factors as memory resources become exhausted leading to uneven quality across the page.

U.S. Pat. No. 6,980,693 (Horie) granted Dec. 27, 2005 discloses an image coding method that compresses an image read through an optical system. An image separation section divides tile (macro block) units of the image into photographic image tiles and character image tiles. A layer separation section performs layer separation pixel by pixel to classify each pixel into pixels belonging to a background and pixels belonging to a foreground. Approximation processors alleviate an increase of entropy, due to layer separation through approximation processing, and carry out JPEG-like processing on photographic images.

To summarise, the current state of published art in hybrid compression of mixed-content documents does not achieve satisfactory performance in all respects. The granularity of the selection is too coarse or the memory/computation overheads are unacceptable. Moreover, achieving 'guaranteed-fit' memory size while preserving even quality over the page has proved elusive.

The above discussion relates to documents which form public knowledge by virtue of their publication. Such should not be interpreted as admission by the present inventors or applicant that such documents form part of the common general knowledge in the art.

SUMMARY OF THE INVENTION

It is an object of the present invention to substantially overcome, or at least ameliorate, one or more disadvantages of existing arrangements.

A Hybrid Compressor is disclosed for compressing a tile of pixels. The pixels of the tile are analysed in order to determine the edges of regions having substantially identical colour values. The remaining pixels not included in such regions are represented as image pixels. Each region having substantially identical colour values is represented in the compression of the tile through data defining the edges of that region, and a value representing the colour of that region.

According to one aspect of the invention, there is provided a method of compressing an image, said image comprising a plurality of bands, at least one said band comprising a plurality of tiles, said method comprising:
- (a) encoding, from a tile of said image, data defining:
  - (i) boundaries of a region of said image tile, said region comprising pixels of substantially identical colour, wherein said region extends over a plurality of scanlines of said image tile; and
  - (ii) a fill colour for said region;
- (b) encoding, using a pixel-based encoding, one or more image pixels of said image tile, said image pixels not being included in said region; and
- (c) compressing said tile using said encoded boundary data, said fill colour, and said encoded image pixels from said tile.

According to another aspect of the invention, there is provided a method of decompressing an image, said method comprising:
- (a) decoding, from a compressed tile of a plurality of compressed tiles in said compressed image, data defining:
  - (i) boundaries of a region of an image tile corresponding to said compressed tile, wherein said region extends over a plurality of scanlines of said corresponding image tile, and
  - (ii) a fill colour for said region;
- (b) decoding, from said compressed tile, pixel-based-encoded image pixels to one or more pixels of said corresponding image tile;
- (c) decompressing said compressed image using said decoded boundary data and fill colour and said decoded image pixels.

According to another aspect of the invention, there is provided a method of compressing an image said image comprising a plurality of bands, at least one said band comprising a plurality of tiles, said method comprising, for at least one said tile:
- (a) generating, from a plurality of tiles of said image, data defining:
  - (i) boundaries of a region of each said tile, each said region comprising pixels of substantially identical colour, and
  - (ii) a fill colour for each said region;
- (b) partitioning said image pixels of said each said tile into one or more elements of differing visual significance, said image pixels not being included in said regions;
- (c) notionally linking elements of the same visual significance from said plurality of tiles to form partitions of uniform visual significance; and
- (d) compressing said tile using said encoded boundary data, said fill colours, and said partitions from said plurality of tiles.

According to another aspect of the invention, there is provided an apparatus for compressing an image, said image comprising a plurality of bands, at least one said band comprising a plurality of tiles, said apparatus comprising:
- (e) a memory for storing a program; and
- (f) a processor for executing the program, said program comprising:
  - (i) code for encoding, from a tile of said image, data defining:
    - boundaries of a region of said image tile, said region comprising pixels of substantially identical colour, wherein said region extends over a plurality of scanlines of said image tile; and
    - a fill colour for said region;
  - (ii) code for encoding, using a pixel-based encoding, one or more image pixels of said image tile, said image pixels not being included in said region; and
  - (iii) code for compressing said tile using said encoded boundary data, said fill colour, and said encoded image pixels from said tile.

According to another aspect of the invention, there is provided an apparatus for decompressing an image, said apparatus comprising:
- (a) a memory for storing a program; and
- (b) a processor for executing the program, said program comprising:
  - (i) code for decoding, from a compressed tile of a plurality of compressed tiles in said compressed image, data defining:
    - boundaries of a region of an image tile corresponding to said compressed tile, wherein said region extends over a plurality of scanlines of said corresponding image tile, and
    - a fill colour for said region;
  - (ii) code for decoding, from said compressed tile, pixel-based-encoded image pixels to one or more pixels of said corresponding image tile;
  - (iii) code for decompressing said compressed image using said decoded boundary data and fill colour and said decoded image pixels.

According to another aspect of the invention, there is provided a computer program product including a computer readable medium having recorded thereon a computer program for directing a processor to execute a method for compressing an image, said image comprising a plurality of bands, at least one said band comprising a plurality of tiles, said program comprising:
- (a) code for encoding, from a tile of said image, data defining:
  - (i) boundaries of a region of said image tile, said region comprising pixels of substantially identical colour, wherein said region extends over a plurality of scanlines of said image tile; and
  - (ii) a fill colour for said region;
- (b) code for encoding, using a pixel-based encoding, one or more image pixels of said image tile, said image pixels not being included in said region; and
- (c) code for compressing said tile using said encoded boundary data, said fill colour, and said encoded image pixels from said tile.

According to another aspect of the invention, there is provided a computer program product including a computer readable medium having recorded thereon a computer program for directing a processor to execute a method for decompressing an image, said program comprising:
- (a) code for decoding, from a compressed tile of a plurality of compressed tiles in said compressed image, data defining:
  - (i) boundaries of a region of an image tile corresponding to said compressed tile, wherein said region extends over a plurality of scanlines of said corresponding image tile, and
  - (ii) a fill colour for said region;
- (b) code for decoding, from said compressed tile, pixel-based-encoded image pixels to one or more pixels of said corresponding image tile;
  - code for decompressing said compressed image using said decoded boundary data and fill colour and said decoded image pixels.

Other aspects of the invention are also disclosed.

BRIEF DESCRIPTION OF THE DRAWINGS

One or more embodiments of the present invention will now be described with reference to the drawings, in which:

FIG. 22 shows a representation of lossless/lossy bitstreams of a tile compressed according to the method of FIG. 5a.

DETAILED DESCRIPTION OF THE EMBODIMENTS

Figure 1:
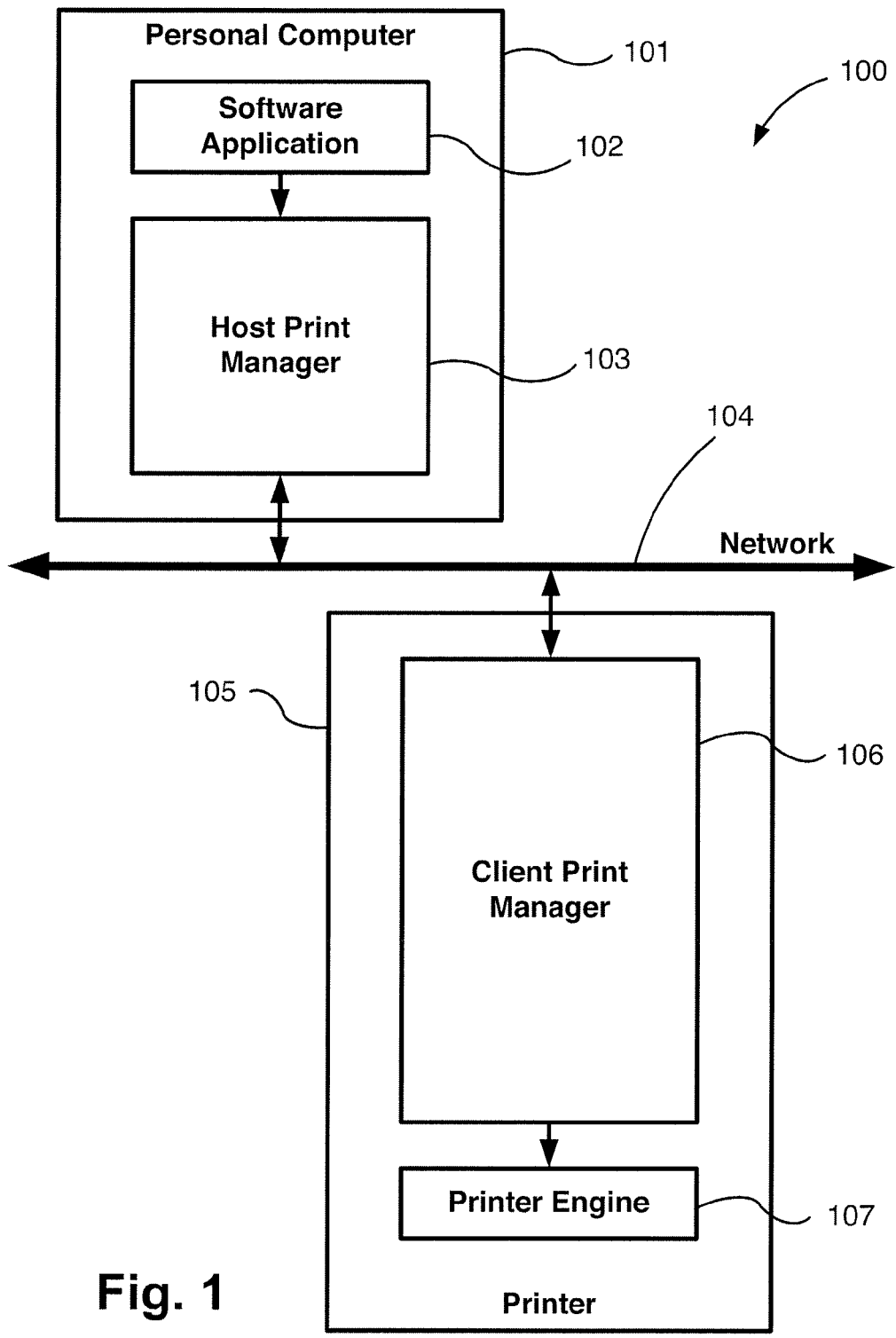
FIG. 1 shows a schematic block diagram of a printing system for rendering and printing a document.

Where reference is made in any one or more of the accompanying drawings to steps and/or features, which have the same reference numerals, those steps and/or features have for the purposes of this description the same function(s) or operation(s), unless the contrary intention appears.

The principles of the arrangements described herein have general applicability to image compression. For ease of explanation the arrangements are described with reference to image compression used in a colour raster image processing system. However, it is not intended that the present invention be limited to the described arrangements. For example, the invention may have application to any arrangement utilising compression where memory resources are limited.

In FIG. 1 a schematic block diagram of a typical printing system 100 is shown, which includes a Personal Computer 101 connected to a Printer 105 through a Network 104. The Personal Computer 101 and the Printer 105 each include at least one processor unit (not illustrated), a memory unit (not illustrated), and a Modulator-Demodulator (Modem) transceiver device for communicating to and from the Network 104. The Printer 105 further includes a Printer Engine 107. The Network 104 may be any connection, including a Universal Serial Port (USB) or parallel port connection.

When a user of the Personal Computer 101 chooses to print a document to a physical medium using the Printer 105, there are a number of well-accepted stages in the process. Firstly, a Software Application 102 executing on the Personal Computer 101 generates data in the form of a page description language (PDL), such as Adobe® PostScript® or Hewlett-Packard's Printer Command Language (PCL), which describes objects to be printed. Secondly, a Host Print Manager 103 also executing on the Personal Computer 103 processes the PDL, before transmitting the resulting data from the Personal Computer 101 via the Network 104 to the Printer 105.

A Client Print Manager 106 in the Printer 105 performs further processing before the resulting data is provided to the Printer Engine 107 of the printer 105 where the resulting data is printed on a physical medium.

The work done by the Host Print Manager 103 and the Client Print Manager 106 usually consists of job generation, raster image processing (RIP), RIP output compression, RIP output decompression and post RIP processing. These tasks can be split between the Host Print Manager 103 and the Client Print Manager 106 in a number of different ways, depending on the type of architecture chosen.

The RIP is responsible for combining the many levels and objects that can exist in a typical print job into a 2-dimensional rasterised output. The output must be capable of defining the colour value for each pixel of the page area at the chosen resolution. Due to the real-time requirements of a laser printer engine, the entire page in raster form is usually available for printing once Post RIP Processing starts.

Post RIP Processing is the process of taking the rendered data, performing any final processing needed and feeding the data in real-time to the Printer Engine 107. If all stages of the print process could guarantee real-time supply of data, then a simple, single pass system could operate, where data is pipelined through the system at constant speed just in time for printing. However, raster image processors do not always operate in real time due to the varying complexity of source data used for rendering.

In a typical laser print engine, post RIP processing must operate in real time as the page is fed through the Printer 105, otherwise the Printer Engine 107 will stall and the entire page will need to be printed again. In order to guarantee supply of data in real-time, an entire page of RIP output must be buffered. The memory required to buffer an entire page of raw pixel data is cost-prohibitive. Therefore, RIP Output Compression is necessary to achieve adequate performance at a low cost. The decompression of the RIP output must also be performed in real time.

The delegation of tasks to either the Host Print Manager 103 or the Client Print Manager 106 depends on the type of architecture chosen. The two common architectures are client-based and host-based.

Figure 2:
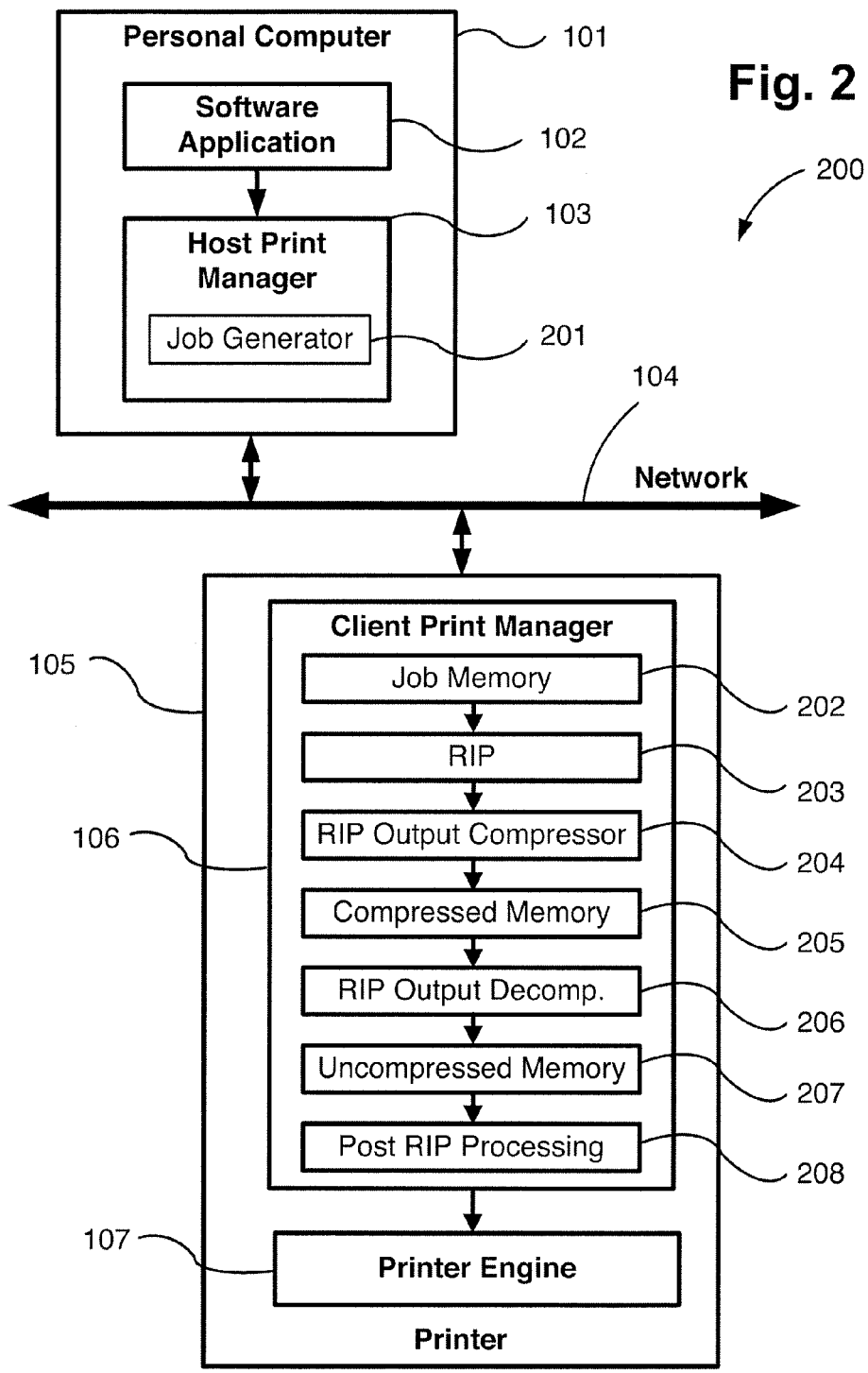
FIG. 2 shows a schematic block diagram of the printing system of FIG. 1 having a client-based architecture.

FIG. 2 shows schematic block diagram of a client-based architecture of the printing system of FIG. 1 where the majority of the processing is performed by the Client Print Manager 106. The user of the Personal Computer 101 chooses to print a document, causing the Software Application 102 to create a PDL, which is sent to the Host Print Manager 103. A Job Generator 201 within the Host Print Manager 103 takes the PDL and organizes it into a format that can be supplied to a RIP 203 in the Client Print Manager 106. From the Job Generator 201 the data is sent over the Network 104 to the Printer 105 which stores the data in a Job Memory 202 of the Client Print Manager 106. The data is then rendered by the RIP 203 to create a bitmap of pixels called the RIP Output. The RIP output is then compressed by a RIP Output Compressor 204 and stored in a Compressed Memory 205. Before the Printer Engine 107 requires the information, the data is decompressed by a RIP Output Decompressor 206 into Uncompressed Memory 207. This data is modified in a number of ways to optimize the print quality on the Print Engine 107 by the Post Rip Processor 208. Finally, the pixel data is supplied to the Print Engine 107.

Figure 3:
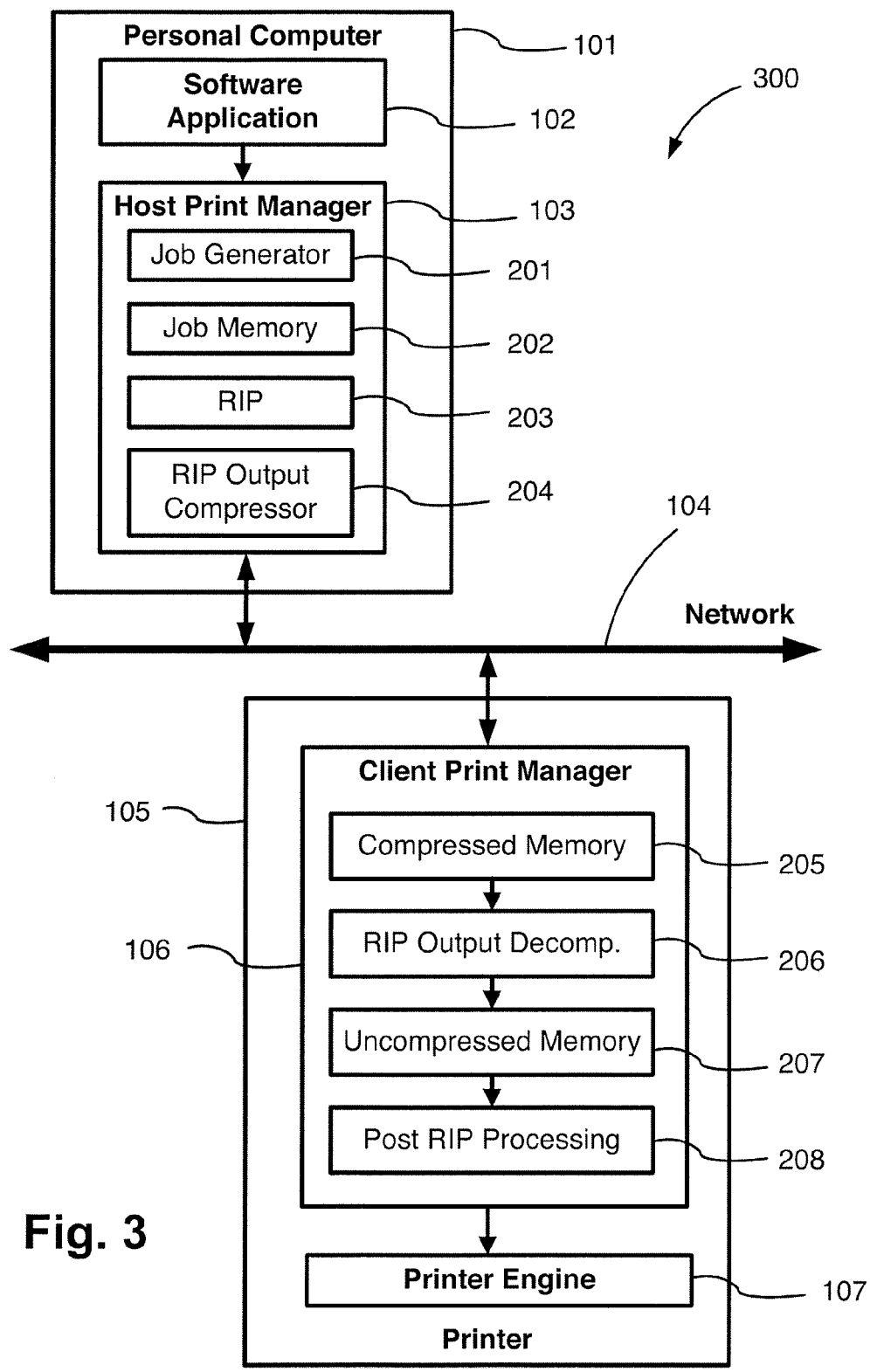
FIG. 3 shows a schematic block diagram of the printing system of FIG. 1 having a host-based architecture.

FIG. 3 shows a schematic block diagram of a host-based architecture of the printing system of FIG. 1 where a large proportion of the processing has been shifted into the Host Print Manager 103. The user of the Personal Computer 101 chooses to print the document, causing the Software Application 102 to create a PDL which is sent to the Host Print Manager 103. The Job Generator 201 processes the PDL and organizes it into a format that can be supplied to the RIP 203. This data is stored in the Job Memory 202 before being rendered by the RIP 203 to create a bitmap of pixels called the RIP Output. The RIP Output is compressed by the RIP Output Compressor 204 and sent over the Network 104 to the Client Print Manager 106 in the Printer 105 to be stored in Compressed Memory 205. Before the Printer Engine 107 requires the information, the data is decompressed by the RIP Output Decompressor 206 and stored in Uncompressed Memory 207. From there, the Post RIP Processor 208 modifies the data in a number of ways to optimize the print quality on the Print Engine 107. Finally, the pixel data is sent to the Print Engine 107.

The embodiments of the present invention include a number of hybrid compression algorithms for compressing rasterised data in a single pass using a combination of lossless compression and lossy compression. The rasterised data is supplied to the compression algorithm in a tile-by-tile order.

The preferred arrangements of the invention compress rendered image data as tiles by generating a compressed version of each tile. For the purposes of this description a tile shall refer a block of K by L pixels wherein there are multiple tiles per band across the width of the page and multiple bands of tiles down the length of the page. Tiles are disjoint and cover the page.

Figure 21:
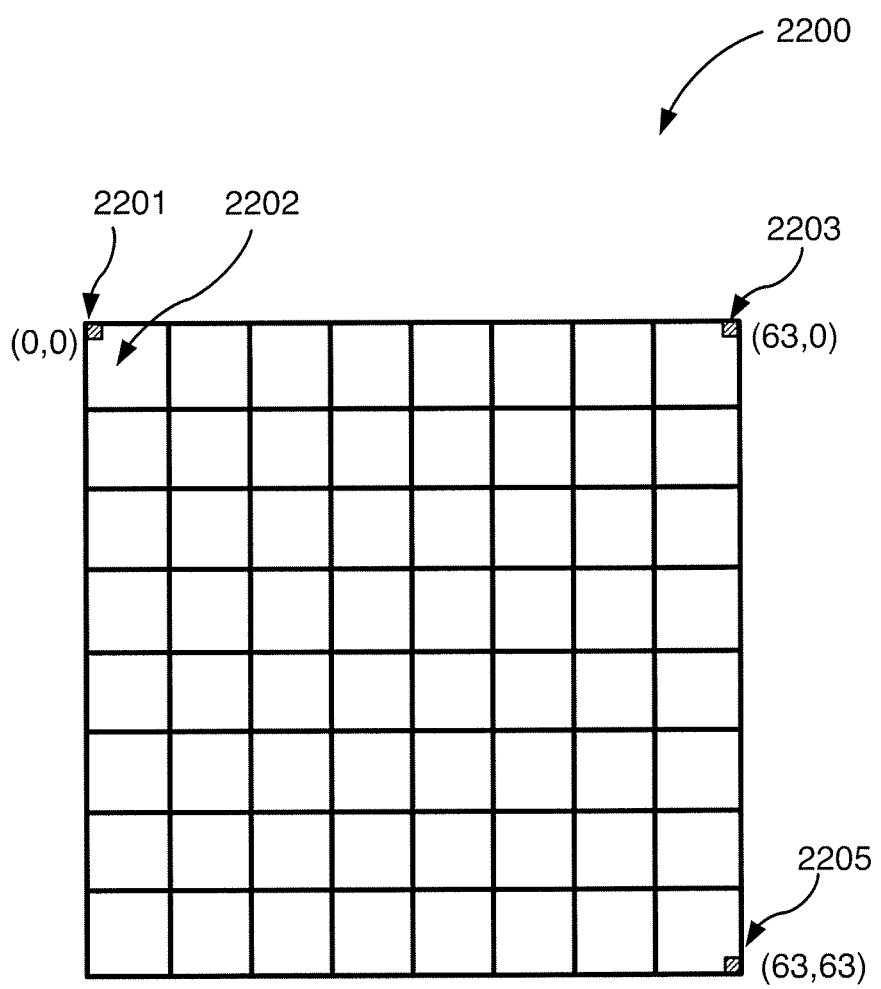
FIG. 21 shows a tile.

Referring to FIG. 21, a tile will be described. A tile 2200 preferably consists of an integer number of blocks 2202 of 8×8 pixels. For example, for an A4 page at a printer resolution of 600 dpi, a suitable choice is K=L=64. The position (X, Y) of a pixel, where X, Y are integers, within the tile 2200 is relative to the upper left hand corner 2201 of the tile 2200. Y indexes the tile rows whereas X indexes the offset of a pixel along a tile row. A tile row consists of the set of pixels that span the width of the tile. For example, the first pixel in the first tile row occupies pixel position (0, 0) 2201 whereas the last pixel in first tile row occupies pixel position (63, 0) 2203. Accordingly, the last pixel in the last tile row occupies position (63, 63) 2205. Tile raster order refers to processing a tile pixel by pixel tile row by tile row, in sequential order, starting with the first tile row and ending with the last tile row. Pixel colour values, P[X, y], within a tile refer to the colour value of pixel P, located at position (X, Y). Where the dimensions of a page do not contain an integer number of tiles the page is preferably padded to the requisite size. Typically tiles are processed one by one though they may also be processed in parallel.

In the preferred arrangement described below in detail the final compressed data output is guaranteed to fit into a fixed amount of memory. This is achieved by reducing the visual quality of data that has been compressed using a lossy compression method. Data that is compressed using a lossless method is not subject to a reduction in quality.

Preferred Arrangement

Figure 4:
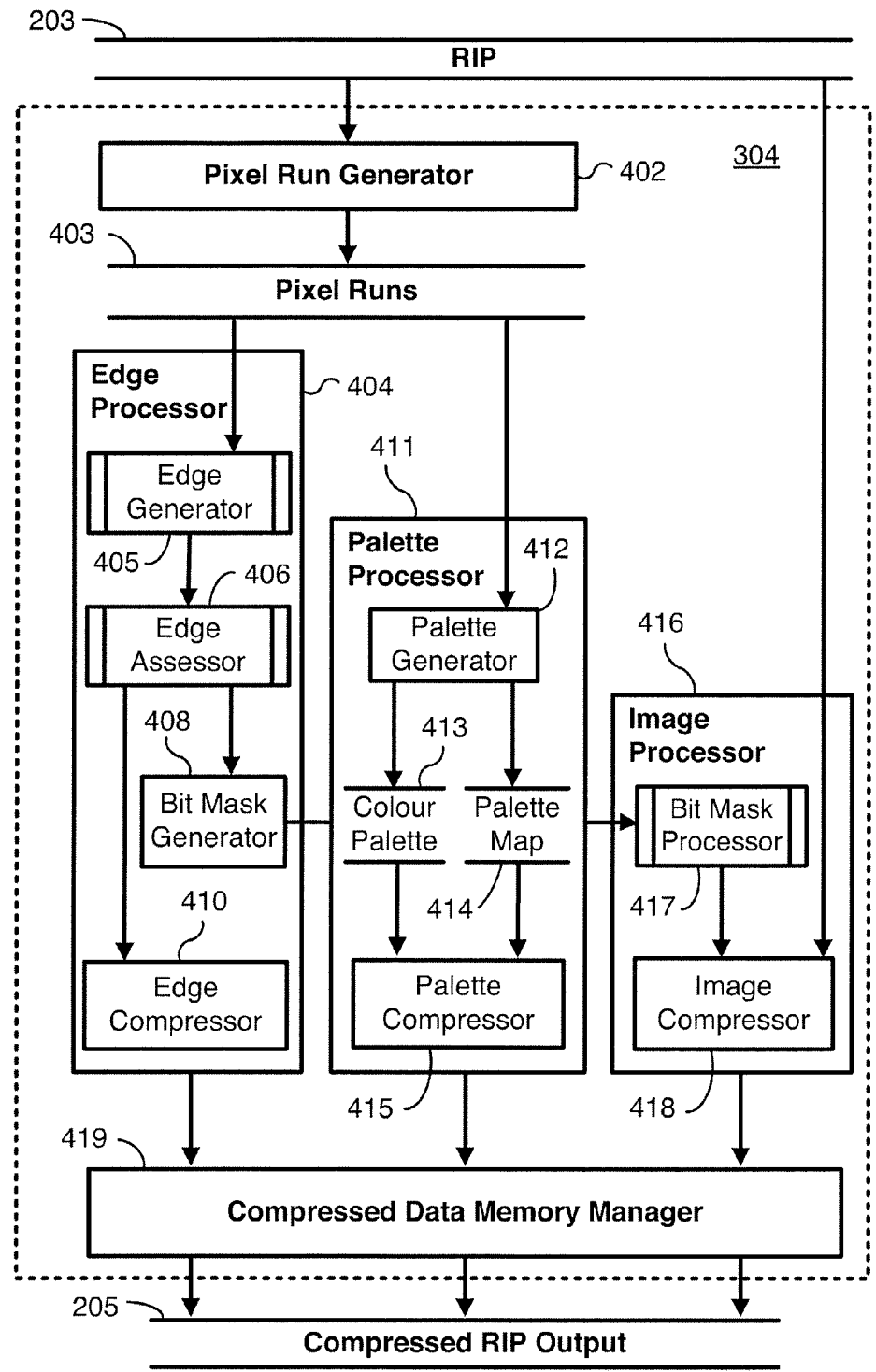
FIG. 4 shows a schematic block diagram for a hybrid compression apparatus as used in the systems of FIGS. 2 and 3 according to the preferred embodiment of the present invention.

The preferred embodiment of the RIP Output Compressor 204 is a Hybrid Compressor 304, a schematic block diagram of which is shown in FIG. 4. The Hybrid Compressor 304 comprises a Pixel Run Generator 402, an Edge Processor 404, a Palette Processor 411, an Image Processor 416 and a Compressed Data Memory Manager 419.

Raw pixel data is supplied to the Pixel Run Generator 402 by the RIP 203. For the purposes of this description pixel data is supplied by the RIP 203 on a tile by tile basis in tile raster order. In the preferred embodiment pixel values are represented by three channels representing a red component (R), a green component (G), and a blue component (B) (referred to as RGB) with 8 bits of precision per channel (referred to as bit depth). Other colour representations such as one cyan, one magenta, one yellow and one black channel could also be utilised, along with other bit depths.

In a further embodiment, a pixel value is an indirect reference that can be used to generate a colour value, i.e. an index to a palette containing sets of one or more colours to be composited to generate the colour value. Throughout this description, 'colour' at a pixel should be taken to include such indirect references to colour.

Each pixel value within a tile is processed by the Pixel Run Generator 402 in tile raster order. The output of the Pixel Run Generator 402 is pixel runs 403. For the purposes of this description a pixel run consists of a run of consecutive pixels, wholly contained on one tile row, that have substantially identical colour values, i.e. identical within a predefined visual distinguishability tolerance. Preferably, the colour values in a run are identical, i.e. the tolerance is zero. An example of pixel run generation will be described in detail below.

The Edge Processor 404 comprises an Edge Generator 405, an Edge Assessor 406, a Bitmask Generator 408 and an Edge Compressor 410. The Edge Processor 404 generates 'edges' from pixel runs via the Edge Generator 405. Edge generation, for the purposes of this description, is the linking of pixel runs of identical, or substantially identical, colour, on a tile row by tile row basis, to describe regions within a tile that have identical, or substantially identical, colour values. Edges define the boundaries between these neighbouring regions. Each region requires two edges to fully define its boundary: an 'enabling' edge which defines the left hand boundary of a region, and a 'disabling' edge that defines the right hand boundary of the region. For the purpose of this description the enabling and disabling edges of a region will be known as an 'edge pair'. Edge pairs are flagged as 'active' whilst they are in a state whereby they can be extended by a pixel run. Edge pairs are flagged as 'inactive' when a pixel run precludes the edge pair from being extended. The Edge Generator 405 also calculates the compressed bit length of an edge pair on an ongoing basis whilst the edge pair is extended. The compressed bit length of an edge pair is the size, in bits, of the raw edge pair data post edge compression. The ability to extend edges over multiple scanlines allows the RIP Output Compressor 204 to take advantage of the inter-scanline coherence of regions within a tile to increase compression of the tile. That is, regions extending over multiple scanlines within a tile are more compressible as edge pairs referencing a colour than as multiple unrelated single-scanline runs of identical colour.

The operation of the Edge Processor 404 and an example of edge pair generation will be described in detail below.

The Edge Assessor 406 compares a generated edge pair against a predetermined selection criterion to determine whether the edge pair is deemed visually significant and therefore retained, or visually insignificant and therefore discarded. An edge pair that is retained is labeled 'valid' and is stored in a suitable memory buffer. A region that is described by a valid edge pair is considered a 'flat' region. Pixels within a flat region are labeled as flat pixels. If an edge pair is discarded the pixels within the now defunct flat region are labeled as 'image' pixels. Image pixels are therefore excluded from the flat regions. Image pixel positions within the tile are recorded in a tile bitmask by the Bit Mask Generator 408.

The Edge Compressor 410 losslessly compresses the valid edge pairs and passes the resulting compressed data bitstream to the Compressed Data Memory Manager 419 for storage.

The Palette Processor 411 comprises a Palette Generator 412, a Colour Palette buffer 413, a Palette Map buffer 414 and a Palette Compressor 415. The Palette Generator 412 is responsible for maintaining the Colour Palette buffer 413, the Palette Map buffer 414 and for calculating the bit length of the compressed palette map. The colour palette is an indexed array of unique colour values that are used within the tile. The colour value of each pixel run is added to the Colour Palette buffer 413 by the Palette Generator 412 only if that colour value does not already exist in the palette buffer 413. There are only a predetermined number of colour values that can be added to the palette before the Colour Palette buffer size is exceeded, i.e. Colour Palette Buffer 413 overflows. The Palette Map buffer 414 stores the palette map, an array containing the colour palette index of each pixel in the tile in tile raster order indicating which colour from the Colour Palette buffer 413 should be used to regenerate the pixel. The Palette Compressor 415 is used to losslessly compress the palette map. A more detailed description of the Palette Processor 411 will be given below.

The Image Processor 416 comprises a Bitmask Processor 417 and an Image Compressor 418. The Image Processor 416 is used to compress pixels indicated by the tile bitmask to be image pixels. The Bitmask Processor 417 analyses the tile bitmask supplied by the Bitmask Generator 408 and determines the position of any image pixels within the tile requiring compression. The Image Compressor 418 can use any accepted method known in the art for compressing natural images, such as JPEG.

In the preferred arrangement of the Hybrid Compressor 304 it is desirable to use an image compressor 418 that can guarantee the size of the compressed image. To achieve this, the Image Compressor 418 used must have the ability to partition the data into most visually perceptible to least visually perceptible elements. This allows less visually perceptible elements to be discarded until the desired (file) size is achieved. In other words, the compressed output is guaranteed to be smaller than some pre-determined size. The preferred embodiment of the Hybrid Compressor 304 follows a particular mode of progressive JPEG. Since the Image Compressor 418 is preferably based on a JPEG compression scheme the Bitmask Processor 417 ensures that image pixels are passed to the Image Compressor 418 in complete 8×8 pixel blocks. In a variation of the preferred embodiment the Bitmask Processor 417 identifies 8×8 pixel blocks that belong to flat regions. These 8×8 pixel blocks are marked as 'skip blocks' and ignored by the Image Compressor 418. A more detailed description of the Image Processor 416, and its preferred and variant operation, will be given below.

The Compressed Data Memory Manager 419 is used to manage the output data bitstreams from the Edge Processor 404, the Palette Processor 411 and the Image Processor 416. The function of the Compressed Data Memory Manager 419 is threefold: memory allocation, tile data location and bitstream deletion. The Compressed Data Memory Manager 419 has access to a fixed amount of free memory for allocation to the bitstreams. Memory is allocated from this free memory in fixed sized chunks. The Compressed Data Memory Manager 419 allocates an initial fixed sized chunk of memory to each of the data bitstreams and records the memory address. As data is passed from each of the processors 404, 411 and 416, the Compressed Data Memory Manager 419 allocates fixed sized chunks to each of the bitstreams as required. Pointers to memory locations within the bitstreams are maintained such that compressed data associated with a tile can be retrieved. In addition, a pointer to the starting location of each row of tiles is maintained and stored in the compressed RIP output 205, so that orthogonal rotation (by odd multiples of 90 degrees) by the RIP Output Decompressor 206 is facilitated. If the free memory is exhausted before compression is completed the Compressed Data Memory Manager 419 deletes the least significant bitstream generated by the Image Compressor 418. The released memory is returned to free memory for allocation to more significant bitstreams. A more detailed description of the arrangement of bitstreams will be given below.

Compression

Figure 5A:
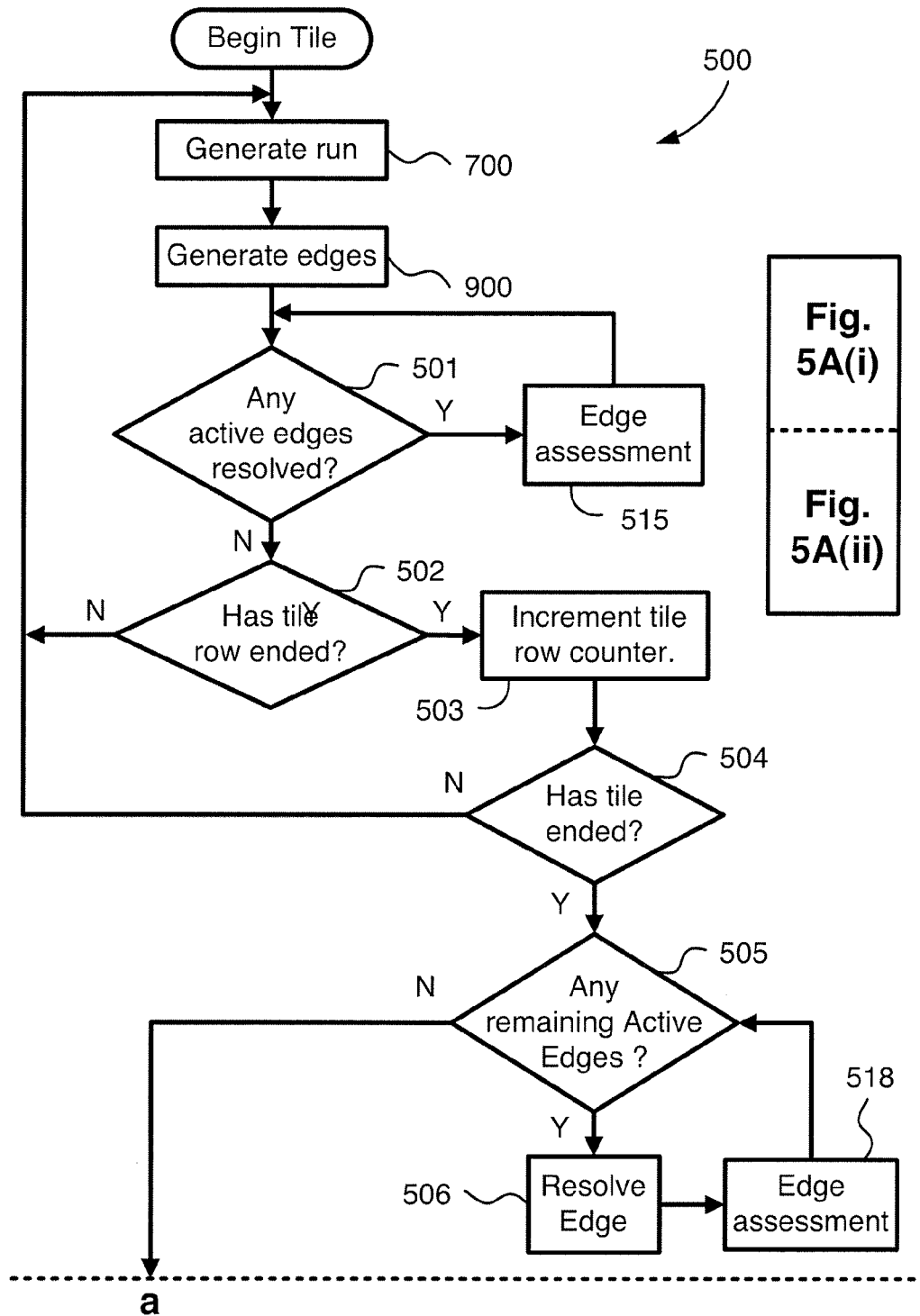
FIG. 5A shows a schematic flow diagram for a method of compressing an image tile executed by the hybrid compression apparatus of FIG. 4.

FIG. 5A shows a schematic flow diagram of a method 500 illustrating the operation of the Hybrid Compressor 304 (FIG. 4). The preferred embodiment of the Hybrid Compressor 304 compresses raw pixel data provided by the RIP 203 on a tile by tile basis. Input to the Pixel Run Generator 402 is from the job memory buffer located in the RIP 203 containing the raw pixel data of a tile, arranged in tile raster order. Starting on the first tile row (current row) within the tile with the pixel located at (0,0) the Pixel Run Generator 402 executes a step 700 which begins a new pixel run. In step 700 the Pixel Run Generator 402 first records the colour value P[0,0] of that pixel and stores the colour value in a suitable data structure. The Pixel Run Generator 402 then analyses the colour value of consecutive pixels in the current tile row, incrementing a pixel run length counter, until it encounters a pixel having a sufficiently different colour value than colour value P[0,0].

The Hybrid Compressor 304 then passes this pixel run to the Edge Generator 405 which executes the step 900, according to which the Edge Generator 405 attempts to join this pixel run to an active edge pair. In the case where the pixel run cannot be joined to an active edge pair the Edge Generator 405 begins a new edge pair. The total compressed bit length for the edge pair, either new or existing, is then updated. If it is determined in step 501 that, through the processing of the pixel run, any active edge pairs are resolved, i.e. precluded from continuing, then those edge pairs are flagged as inactive and assessed in step 515 for visual significance by the Edge Assessor 406. Depending on the outcome of the edge pair assessment the edge pair is either marked in step 515 as valid or discarded. If the edge pair is marked as valid it is retained for processing by the Edge Compressor 410. If the edge pair is discarded the Bitmask Generator 408 updates the tile bitmask. The Pixel Run Generator 402 continues processing pixels until it is determined in step 502 that the end of the current tile row has been reached.

When it is determined in step 502 that the end of the current tile row has been reached the current pixel run is ended and passed to the Edge Generator 405. The tile row count is incremented in step 503 and the next tile row is processed. This process continues until it is determined in step 504 that the last tile row in the tile is processed.

When it is determined in step 504 that all tile rows in the tile have been processed, it is determined in step 505 whether any active edge pairs remain. Any remaining active edge pairs are resolved in step 506 and assessed, in step 518, by the Edge Assessor 406.

Simultaneously with steps 900 and 515, the pixel runs generated in step 700 are passed to the Palette Processor 411 in order for the Palette Generator 412 to maintain the colour palette in the Colour Palette buffer 413 and the palette map in the Palette Map buffer 414, until the Colour Palette buffer 413 overflows, and to calculate the current palette bit length, as described below.

If it is determined in step 505 that no active edge pairs remain, then it is determined in step 507 whether any edge pairs were discarded. If no edge pairs were discarded during edge assessment in process 1800 then the disabling edges are discarded in step 510 from the edge pairs and Compression Path Type 3 is selected in step 570 before the method terminates.

If it is determined in step 507 that edge pairs have been discarded then it is determined in step 508 whether the Colour Palette buffer 413 has overflowed. If the Colour Palette buffer 413 has not overflowed then it is determined in step 511 whether any edge pairs remain. If there are no remaining edge pairs then Compression Path Type 2 is selected in step 560 before the method 500 terminates. Alternatively, if it is determined in step 511 that there are remaining edge pairs then Compression Path Type 4 is selected in step 580 before the method 500 terminates.

If it is determined in step 508 that the Colour Palette buffer 413 has overflowed then it is determined in step 509 whether any edge pairs remain. If there are remaining edge pairs then Compression Path Type 5 is selected in step 590 before the method 500 terminates. Alternatively, if it is determined in step 509 that there are no remaining edge pairs then Compression Path Type 1 is selected in step 550 before the method 500 terminates.

Table 1 gives an overview of the 5 Compression Path Types.

TABLE 1

Compression path types.

| Compression Path Type | Method | Description |
|---|---|---|
| 1 | lossy | Image pixels are compressed using the Image Compressor. |
| 2 | lossless | The tile is compressed using the Palette Compressor. The Palette Map is either compressed or left uncompressed. |
| 3 | lossless | The tile is compressed using the Edge Compressor or the Palette Compressor. Each disabling edge is discarded and only enabling edges are encoded. If the Edge Compressor is selected then a decision is made whether to code enabling edge colour values as raw colour values or Colour Palette index values. |
| 4 | lossless (hybrid) | The tile is compressed using either the Palette Compressor or the Edge Compressor. If the Edge Compressor is selected then a decision is made whether to code edge pair colour values and remaining image pixels as raw colour values or Colour Palette index values. |
| 5 | lossless/ lossy (hybrid) | The tile is compressed using the Edge Compressor and the Image Compressor. Edge pairs are compressed using the Edge Compressor and image pixels are compressed using the Image Compressor. |

Figure 22:
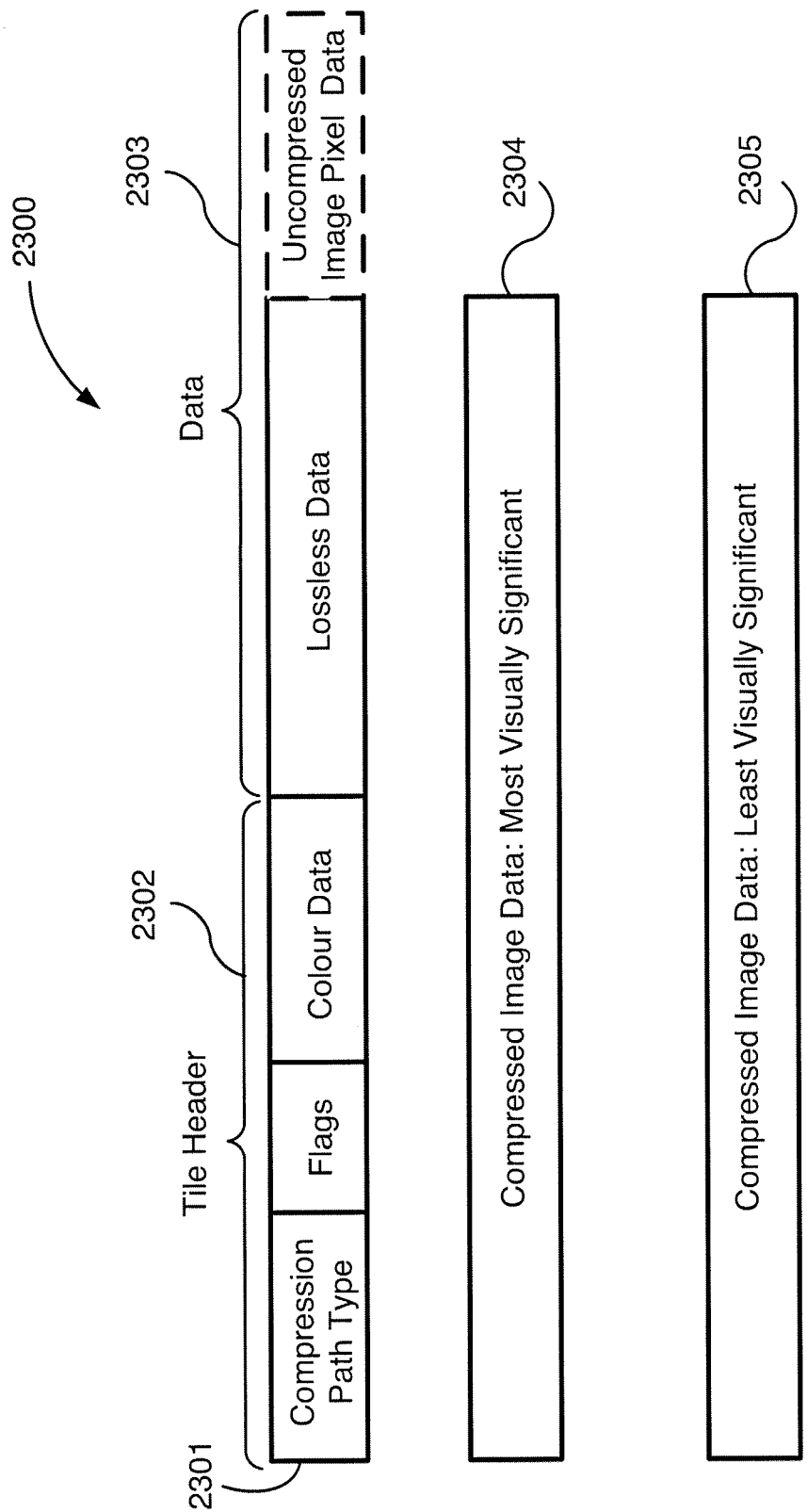

FIG. 22 illustrates a representation of tile data 2300 within the bitstreams. The first bitstream 2301 contains a tile header 2302 for each tile, optionally followed by lossless data 2303 for that tile. If the tile contains lossily compressed data then additional bitstreams 2304 to 2305 are utilised to store the most visually perceptible to least visually perceptible elements. The representation allows the least visually perceptible data 2305 to be discarded if needed by the Compressed Data Memory Manager 419.

The tile header 2302 consists of data identifying the compression path type of the tile, encoding flags and colour data. The compression path type is one of the five types outlined in Table 1. Encoding flags indicate the compression and colour data storage methods utilised. Colour data within the header 2302 consists of either a combination of Colour Palette and colour palette index values, or raw colour values.

Following the tile header data 2302 in the bitstream 2301 is the lossless data 2303. The lossless data 2303 consists of either a palette map or edge data depending on the compression method(s) utilised. If required by the compression path, uncompressed image pixel data (shown in phantom) is appended to the lossless data 2303.

Each of the five compression path types will now be described in detail.

Figure 5B:
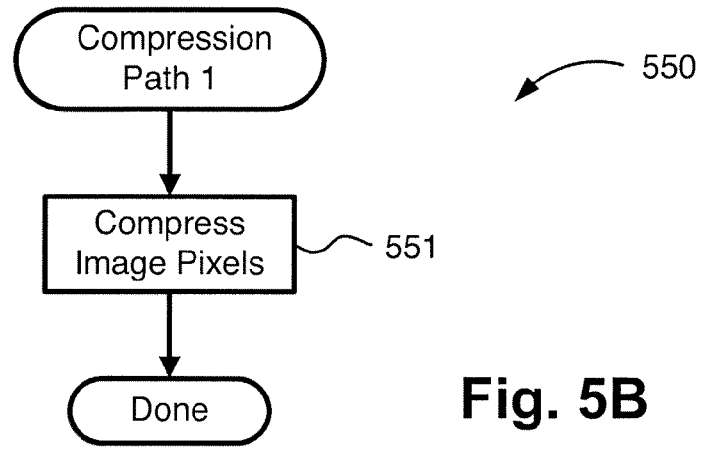
FIG. 5B shows a schematic flow diagram for a method of lossy compression, as used in the method of FIG. 5A.

Compression path type 1 is a lossy compression path type. All pixels within the tile have been labelled as image pixels in the tile bitmask. FIG. 5B shows a schematic flow diagram of compression 550 according to compression path type 1. The Image Compressor 418 compresses in step 551 all pixels within the tile as image pixels. The process used for compressing image pixels will be described in detail below.

Figure 5C:
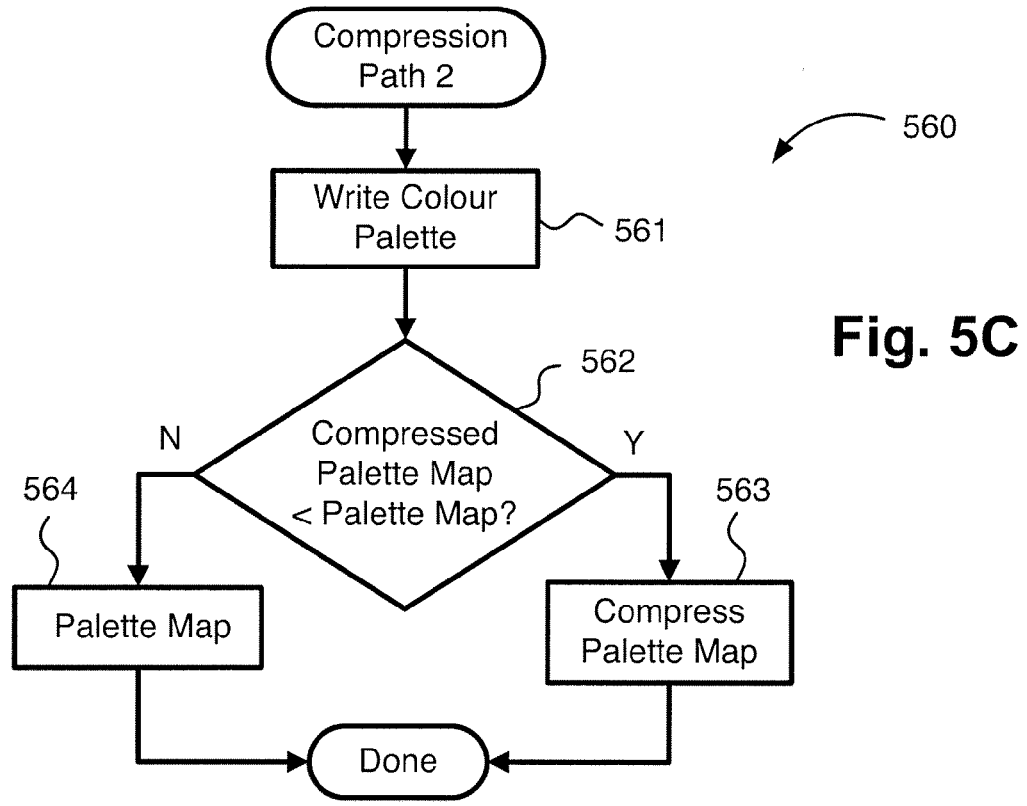
FIG. 5C shows a schematic flow diagram for a method of lossless compression, as used in the method of FIG. 5A.

Compression path type 2 is a lossless compression path type. Pixels within the tile have either been labelled as image pixels in the tile bitmask or belong to flat regions. FIG. 5C shows a schematic flow diagram of compression 560 according to compression path type 2. The palette map from the Palette Map buffer 414 can either be written to the lossless data bitstream 2303 in a compressed format (to be described later) or in an uncompressed format, depending on which format requires the least amount of memory. An encoding type flag is written to the tile header 2302 indicating which format is selected. The colour palette is then written in step 561 to the colour data of the tile header 2302 in the order the palette colours were generated during pixel run generation. A comparison of pre-calculated compressed Palette Map bit length is then made with the uncompressed palette map bit length in step 562. If the bit length of the compressed palette map is smaller than that of the uncompressed palette map then the palette map 414 is first compressed by the Palette Compressor 415 and the resulting compressed palette map is then written in step 563 to the lossless data 2303 bitstream. Alternatively, if the bit length of the uncompressed palette map is smaller than that of the compressed palette map then the palette map is written in step 564 to the lossless data 2303 bitstream in uncompressed format. Accordingly, the palette bit length at any time is the lower of the two bit lengths resulting from each format of the palette map, (compressed or uncompressed), added to the bit length of the colour palette itself. Finally, any edge data for the tile is discarded.

Figure 5D:
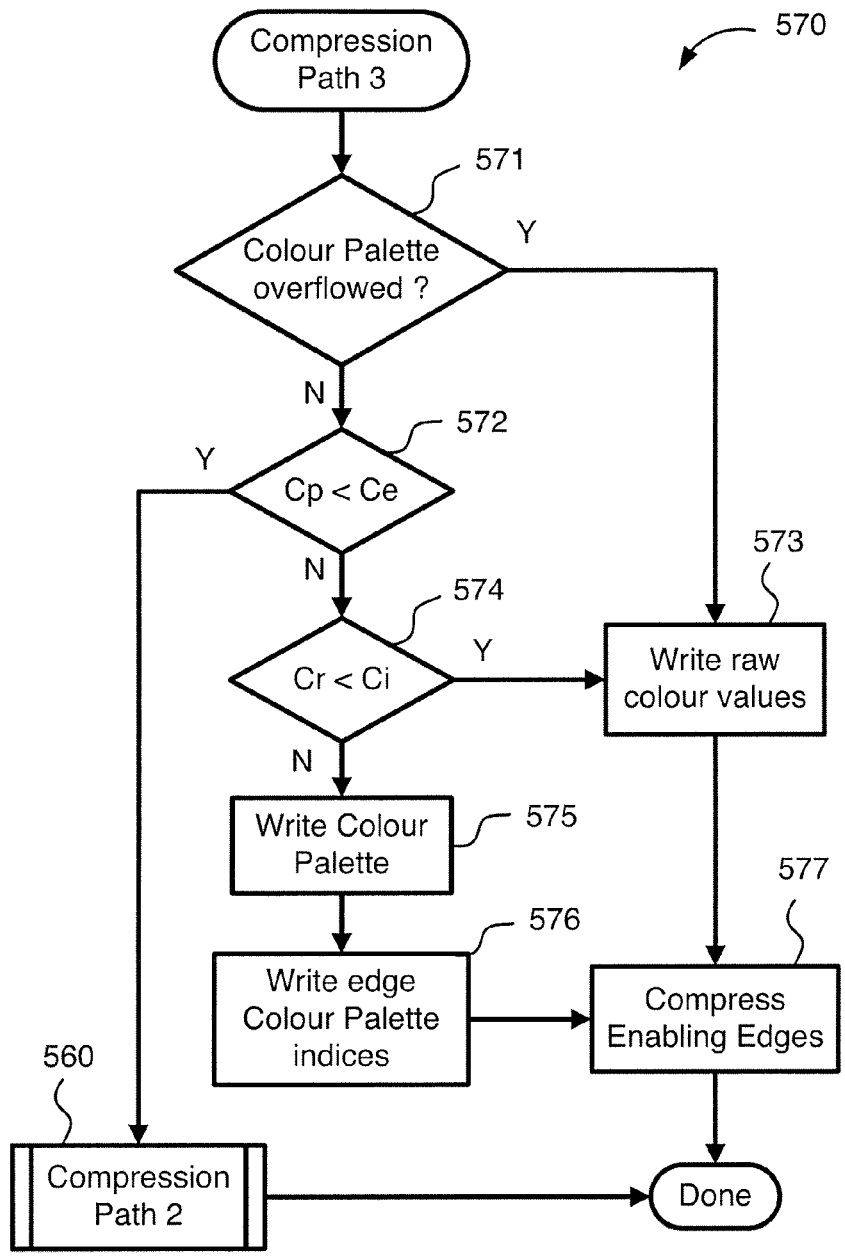
FIG. 5D shows a schematic flow diagram for another method of lossless compression, as used in the method of FIG. 5A.

Compression path type 3 570 is another lossless compression path type. All pixels within the tile belong to flat regions. Since no edge pairs have been discarded all pixels are contained within flat regions and disabling edges are discarded in this case. FIG. 5D shows a schematic flow diagram of compression 570 according to compression path type 3. Compression 570 starts in step 571 where it is determined whether the Colour Palette buffer 413 has overflowed. In the case where the Colour Palette buffer 413 has overflowed 571 then an encoding type flag is written to the tile header 2302 indicating the Colour Palette buffer 413 has overflowed, and raw colour values are written to the tile header 2302 in step 573. In particular, the raw colour value corresponding to each enabling edge within the tile is retrieved from the valid edge buffer and written to the tile header 2302 in the order the edge was generated whilst processing the tile. Valid enabling edges are passed to the Edge Compressor 410 in the order they were generated within the tile by the Edge Generator 405 and the enabling edges are compressed in step 577 in a manner described below, before the compressed enabling edge data is written to the lossless data 2303 bitstream.

If it is determined in step 571 that the Colour Palette buffer 413 did not overflow a decision is made to either compress the tile as palette data or as edge data. This choice is made based on the pre-calculated values of the palette bit length $C_p$ and the edge compression bit length $C_e$ made by the Palette Generator 412 and the Edge Generator 405 respectively. The edge compression bit length $C_e$ is the sum of the bit length of the compressed edges themselves and that of their corresponding colour values, in either raw or palette index representation (whichever is shorter). In particular, if it is determined in step 572 that the palette bit length $C_p$ is less than the edge compression bit length $C_e$ then the tile data is compressed using Compression Path Type 2 in step 560. An encoding type flag is written to the tile header 2302 indicating that the tile is compressed as palette data.

In the case where the edge compression bit length $C_e$ is less than the palette bit length $C_p$ the data is encoded as edges. In step 574 it is determined whether the raw colour value bit length $C_r$ is less than the sum $C_i$ of the bitlength of the colour palette and the colour palette index values. This decision is based on the method of encoding the enabling edge colour values that offers the minimum overall bit length. Details of this calculation will be described below.

If it is determined that the raw colour value bit length $C_r$ is less than the sum $C_i$ then an appropriate colour type flag is written to the tile header 2302. The raw colour values corresponding to each enabling edge are written in step 573 to the tile header 2302 in the order the edge was generated whilst processing the tile. Each valid enabling edge is then passed to the Edge Compressor 410 and the resulting compressed data is written in step 577 to the lossless data bitstream 2303. An encoding type flag is written to the tile header 2302 indicating that the tile is compressed as edge data.

If it is determined in step 574 that the sum $C_i$ is less than the raw colour value bit length $C_r$ 574 then an appropriate colour type flag is written to the tile header 2302. The colour palette from the Colour Palette buffer 413 is written in step 575 to the tile header 2302 followed by step 576 where the Colour Palette indices corresponding to the colour value associated with each enabling edge within the tile are written to the tile header 2302 in the order the edge was generated whilst processing the tile. Each valid enabling edge is passed then to the Edge Compressor 410 for compression in step 577 and the resulting compressed data is written to the lossless data bitstream 2303. An encoding type flag is written to the tile header 2302 indicating that the tile is compressed as edge data.

Figure 5E:
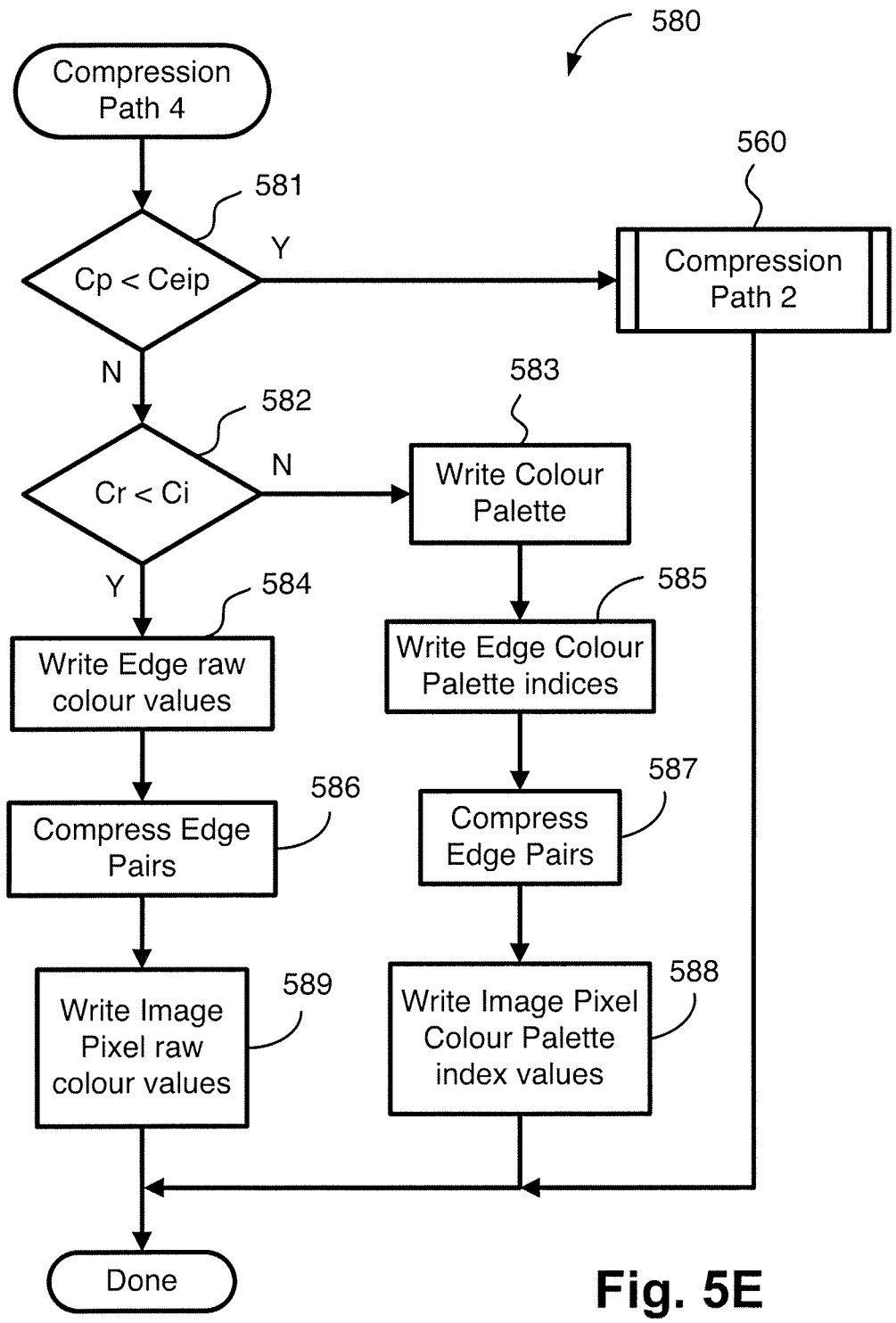
FIG. 5E shows a schematic flow diagram for another method of lossless compression, as used in the method of FIG. 5A.

Compression path type 4 580 is yet another lossless compression path type. In the present case pixels within the tile have either been labelled as image pixels in the tile bitmask or belong to flat regions. Since there are image pixels in the tile, both enabling and disabling edges are required to define the flat pixels regions. FIG. 5E shows a schematic flow diagram of compression 580 according to compression path type 4. A decision is made regarding the best method of lossless compression to be used from edge compression plus uncompressed image pixel values and palette compression. This decision is based on which method provides the minimum bit length for the lossless data bitstream. Compression 580 starts in step 581 where a comparison is made of the pre-calculated sum $C_{eip}$ of the compressed bit length for edge compression and the image pixel values, and the pre-calculated bit length for the colour palette $C_p$ (as pre-calculated by the Palette Generator 412). The pre-calculated sum $C_{eip}$ of the compressed bit length for edge compression and the image pixel values is calculated by the following equation:

$$C_{eip}=C_e+Q\log_2 N \quad (1)$$

where $C_e$ is the size of the compressed edge bitstream (as calculated by the Edge Generator 405), Q is the number of image pixels and N is the maximum number of colours able to be stored in the Colour Palette buffer 413.

If it is determined in step 581 that bit length for the colour palette $C_p$ is less than the pre-calculated sum $C_{eip}$ then Compression Path Type 2 is selected in step 560 to compress the tile. An encoding type flag is written to the tile header 2302 indicating the outcome of this choice.

If it is determined in step 581 that the pre-calculated sum $C_{eip}$ is less than the bit length for the colour palette $C_p$ 581 then a choice has to be made as to whether to code the enabling edge colour values as either raw colour values or as Colour Palette index values. A colour type flag is written to the tile header 2302 indicating the outcome of this choice.

If it is determined in step 582 that the raw colour value bit length $C_r$ is less than the sum $C_i$ of the bit length of the colour palette and the colour palette index values then the raw colour value corresponding to each edge pair is written in step 584 to the colour data in the tile header 2302 in the order the edge pair was generated whilst processing the tile. Each valid edge is then passed to the Edge Compressor 410 where the edge pairs are compressed in step 586 and written to the lossless data bitstream 2303 in the same order the edge pairs were generated within the tile by the Edge Generator 405. Then, in step 589, the raw colour values for the image pixels, identified by the tile bitmask, are written in tile raster order to the lossless data bitstream 2303.

Alternatively if it is determined in step 582 that the sum $C_i$ is less than the raw colour value bit length $C_r$ then the colour palette is first written in step 583 to the colour data of the tile header 2302. Then, in step 585, the colour palette indices corresponding to the colour value for each edge pair within the tile is retrieved from the Colour Palette buffer 413 and written to the tile header 2302 in the order the edge pair was generated whilst processing the tile. Each valid edge pair is then passed to the Edge Compressor 410 where in step 587 the edge pairs are compressed and written to the lossless data bitstream 2303. The colour palette index values corresponding to each colour value for the image pixels, as identified by the tile bitmask, are written in tile raster order in step 588 to the "uncompressed image pixel data" part of lossless data bitstream 2303.

Figure 5F:
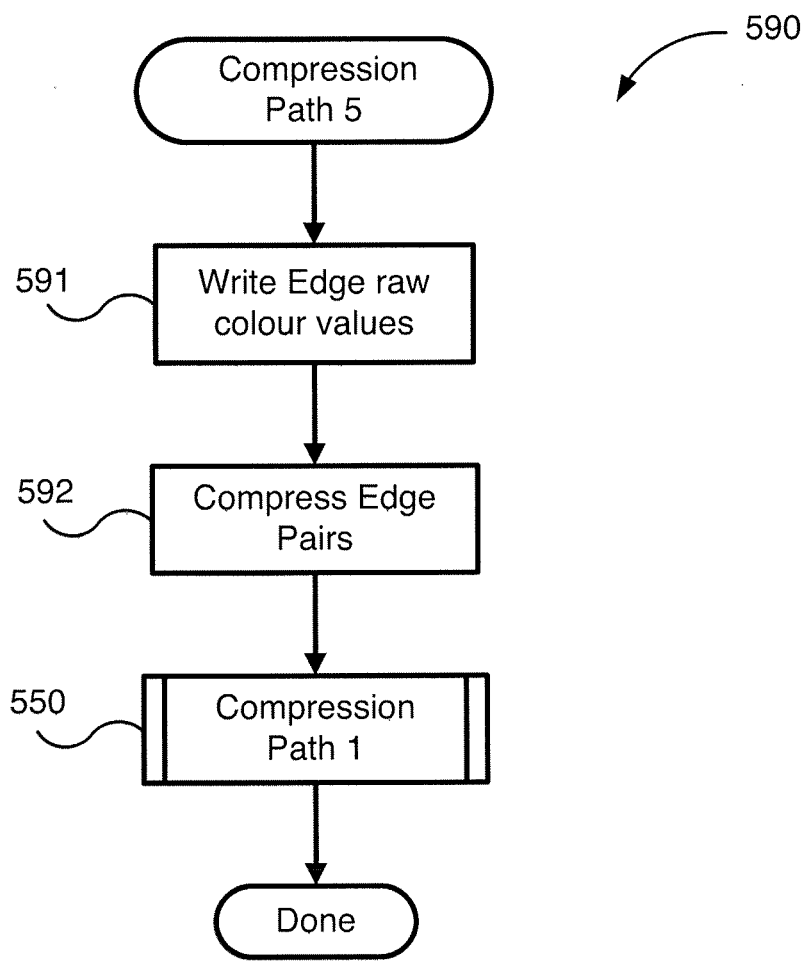
FIG. 5F shows a schematic flow diagram for lossless/lossy compression, as used in the method of FIG. 5A.

Compression path type 5 590 is a lossless/lossy compression path type. Pixels within the tile have either been labelled as image pixels in the tile bitmask or belong to flat regions. FIG. 5F shows a schematic flow diagram of compression 590 according to compression path type 5. Firstly, the raw colour value corresponding to each edge pair is written in step 591 to the colour data of the tile header 2302 in the order the edge pair was generated whilst processing the tile. Then, in step 592, each valid edge pair is passed to the Edge Compressor 410 where edge pairs are compressed and written to the lossless data bitstream 2303. Then the image pixels, as identified by the tile bitmask, are compressed in step 550 using Compression Path Type 1 and written to lossy bitstreams 2304-2305.

Pixel Run Generation

Figure 6:
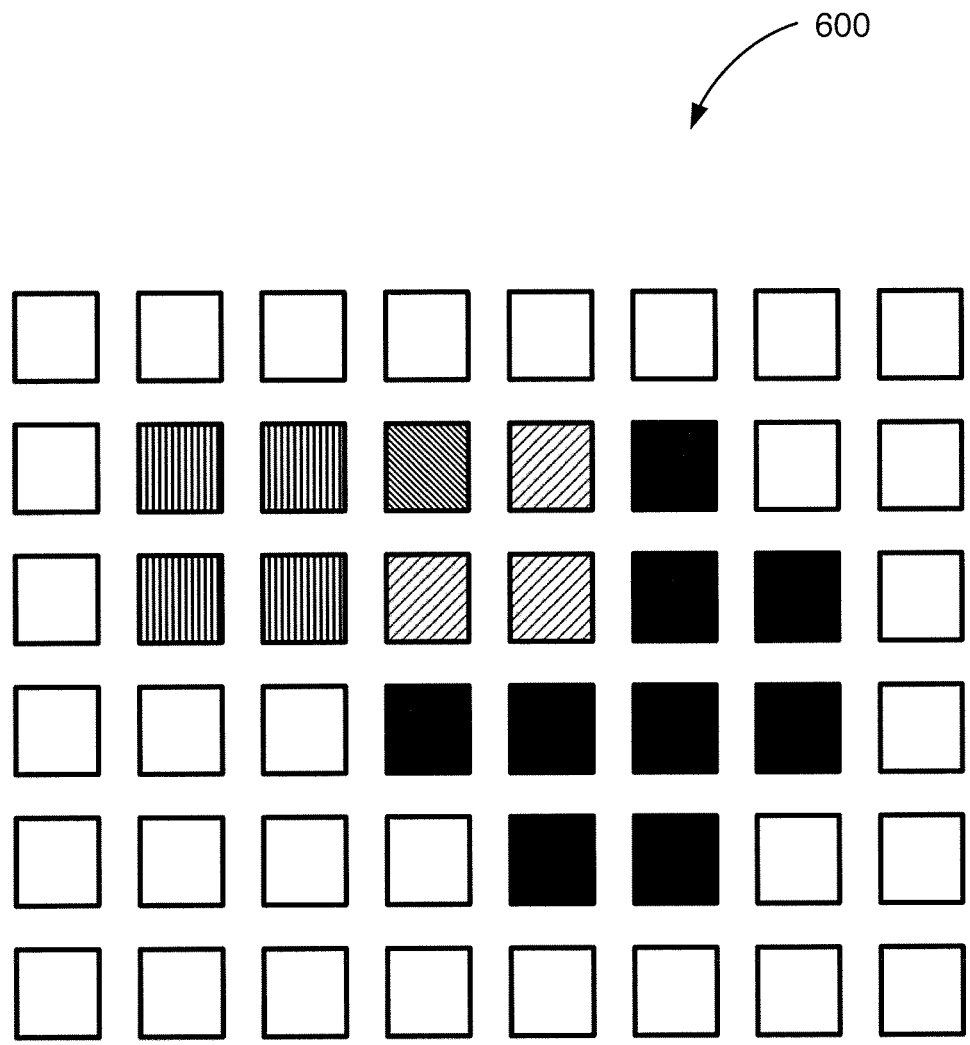
FIG. 6 illustrates a subset of pixels from a tile of differing pixel values.

The step 700 executed by the Pixel Run Generator 402 as part of method 500 (FIG. 5A) is now described in detail with reference to FIG. 7 where a schematic flow diagram of step 700 is shown. On a tile by tile basis the Pixel Run Generator 402 generates pixel runs. FIG. 6 illustrates a subset of pixels 600 from a tile of differing pixel values. Whilst it is appreciated that a typical tile size is 64 by 64 pixels, only a subset of the pixels of a typical tile is shown here for clarity. Pixel run information is stored in a suitable data structure which contains at least a colour value for the pixel run and a pixel run length counter for storing the length of the pixel run.

Figure 7:
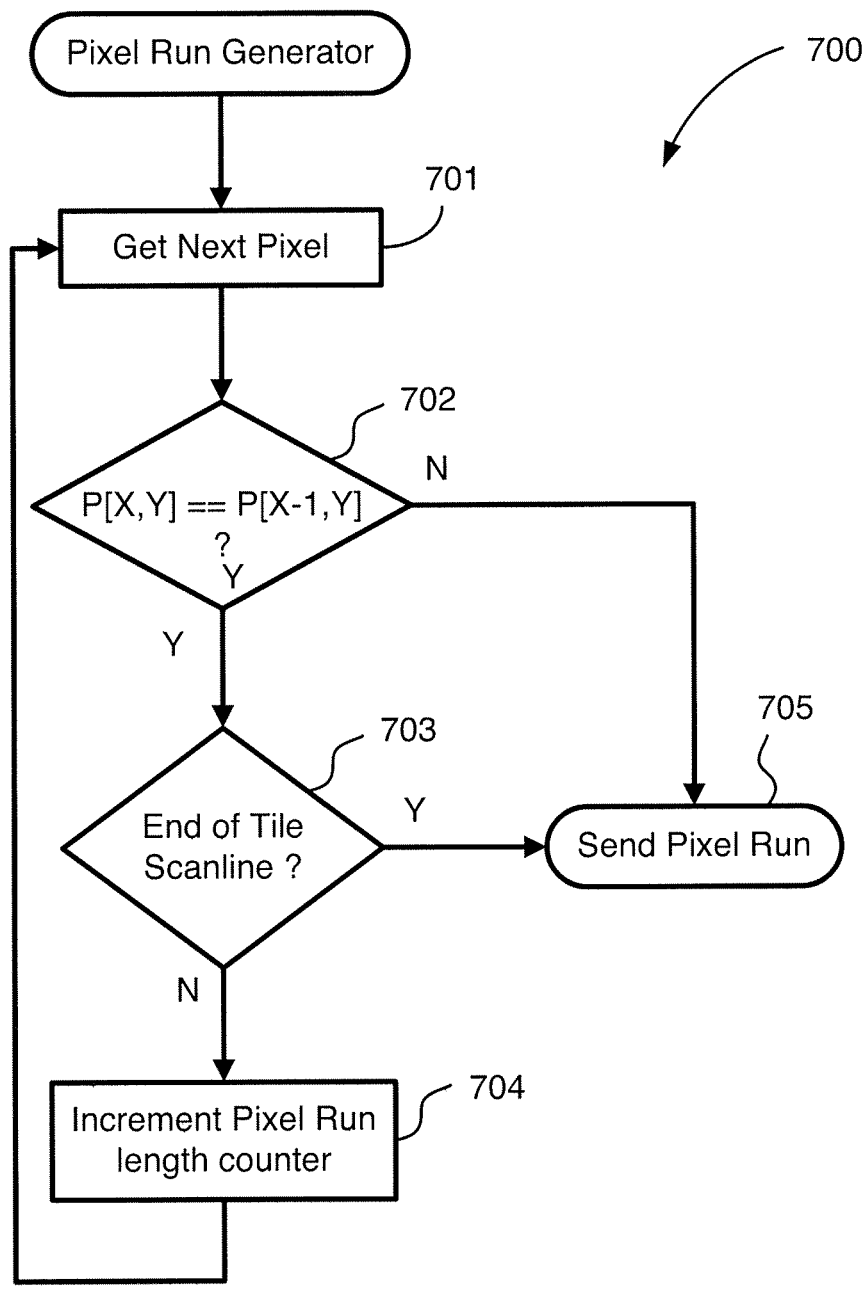
FIG. 7 shows a schematic flow diagram of a method for generating pixel runs, as used in the method of FIG. 5A.

Referring to FIG. 7, pixels are read in step 701 one by one. It is then determined in step 702 whether the current pixel colour value P[X,Y] is identical (or substantially identical) to the previous pixel colour value P[X−1,Y]. If the current pixel colour value P[X,Y] is identical (or substantially identical) to the previous pixel colour value P[X−1,Y] then it is determined in step 703 whether the tile scanline (tile row) has ended. If the tile scanline has not yet ended then the pixel run length counter is incremented in step 704 and the step 700 returns to step 701 from where the next pixel in the tile scanline is processed.

If it is determined in step 702 that the current pixel colour value P[X,Y] is not identical to the previous pixel colour value P[X−1,Y], or if it is determined in step 703 that the tile scanline has ended, the pixel run is ended in step 705 and sent to the Edge Processor 404 and the Palette Processor 411. This means that the Pixel Run Generator 402 need only store one pixel run at any given time during processing of the tile.

Figure 8:
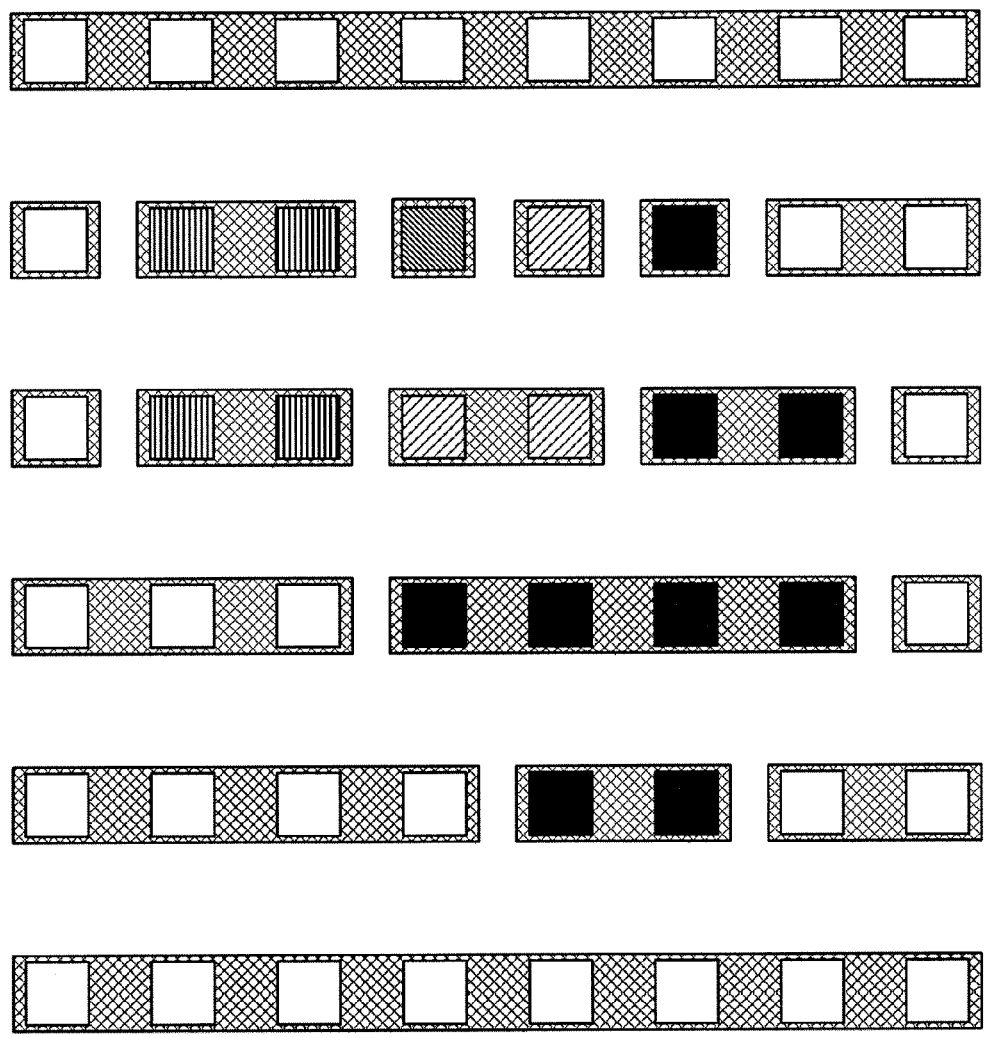
FIG. 8 shows the pixels shown in FIG. 6 arranged in pixel runs.

FIG. 8 shows the pixels from the subset of pixel 600 shown in FIG. 6 grouped into pixel runs. All pixels runs are highlighted in FIG. 8 for clarity, but it should be appreciated that pixel runs are sent to the Edge Generator 405 one by one as they are generated.

Edge Generation

After adjacent pixels on a scan line are formed into a pixel run they are sent to the Edge Processor 404. On a tile by tile basis the Edge Processor 404 generates and stores edge pair data, pre-calculates the expected compressed bit length for edge pairs, assesses resolved edge pairs for visual significance, maintains the tile bitmask and losslessly compresses edge pair data.

Edge pair data is stored by the Edge Processor 404 in a suitable data structure. This data structure contains at least; the start Y position (tile row number), the start X offset along the tile row, and the list of X offset positions for every tile row that the enabling edge in the edge pair traverses; the start X offset along the tile row and the list of X offset positions for every tile row that the disabling edge in the edge pair traverses; the total number of tile rows the edges traverse (edge_length); the colour value of the region the edge pair is describing; an active/inactive flag indicating the state of the edge pair; a compressed edge pair bit length counter; and the maximum width of the region.

Figure 10:
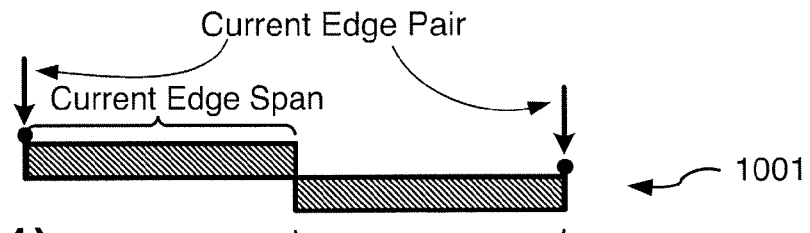
FIGS. 10(1)-10(5) show examples of when pixel runs are joined.
Figure 10:
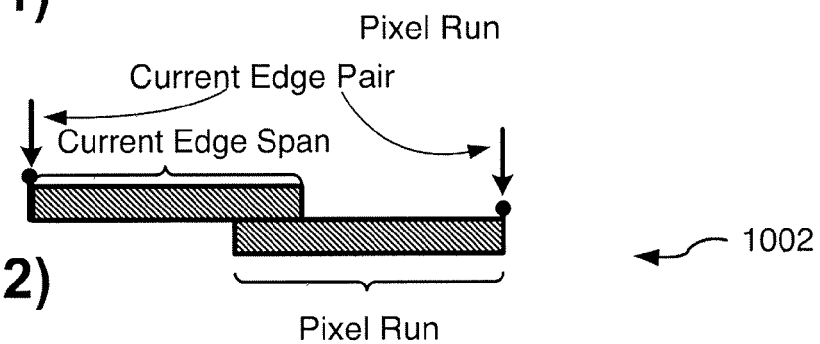
Figure 10:
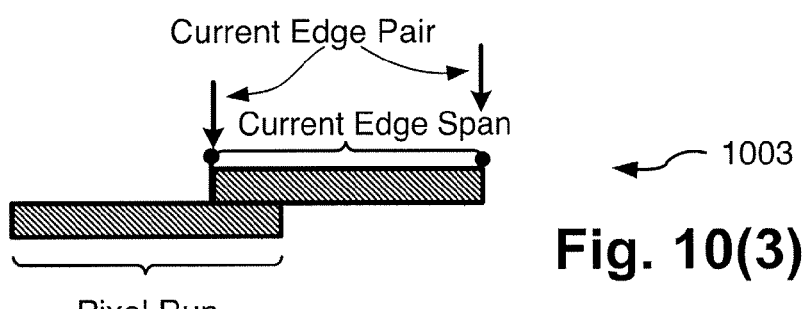
Figure 10:
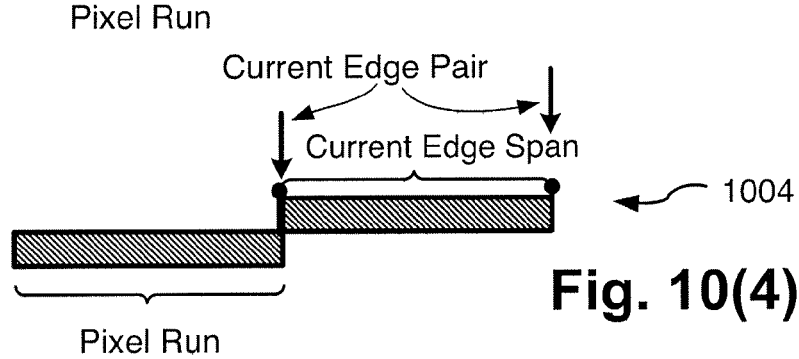
Figure 10:
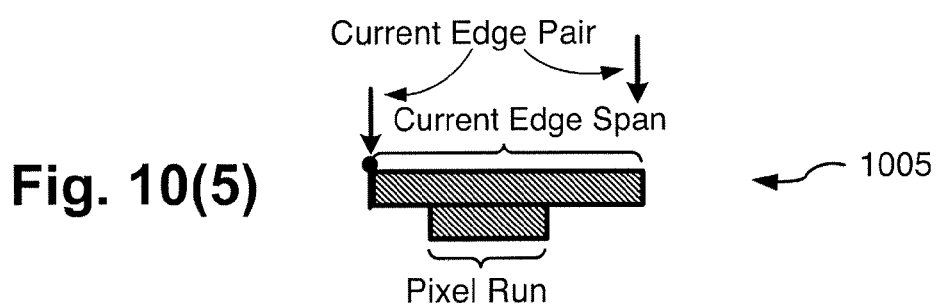

The edge generation process creates edge pairs that link pixel runs of identical colour value on adjacent scanlines to one another forming multi-scanline flat regions as described above. New edge pairs, as they are created, are marked as active until they are precluded from continuing. Edge pairs are extended when a pixel run on the current scanline overlaps an active edge pair and passes the criteria for joining. For a pixel run to join an active edge pair the pixel run must connect to (using 8-way connectedness) an area that is currently spanned by an active edge pair and have an identical colour value to that associated with the edge pair. As will be described below, it is convenient to consider active edge pairs on the previous scanline when attempting to determine whether or not a pixel run joins any existing active edge pairs. Edge pairs are not permitted to cross other edge pairs; the flat regions that are described by edge pairs within a tile are disjoint. Edge pairs can be precluded from continuing in one of two ways: a pixel run on the next tile scanline spans across an active edge pair in such a way that the active edge is precluded from continuing, or the last scanline in the tile is processed and the tile ends. In the event the edge pair is precluded from continuing it is considered 'resolved' and flagged as inactive. FIGS. 10(1)-10(5) show examples 1001, 1002, 1003, 1004 and 1005 of when the joining criteria are met.

Figure 9:
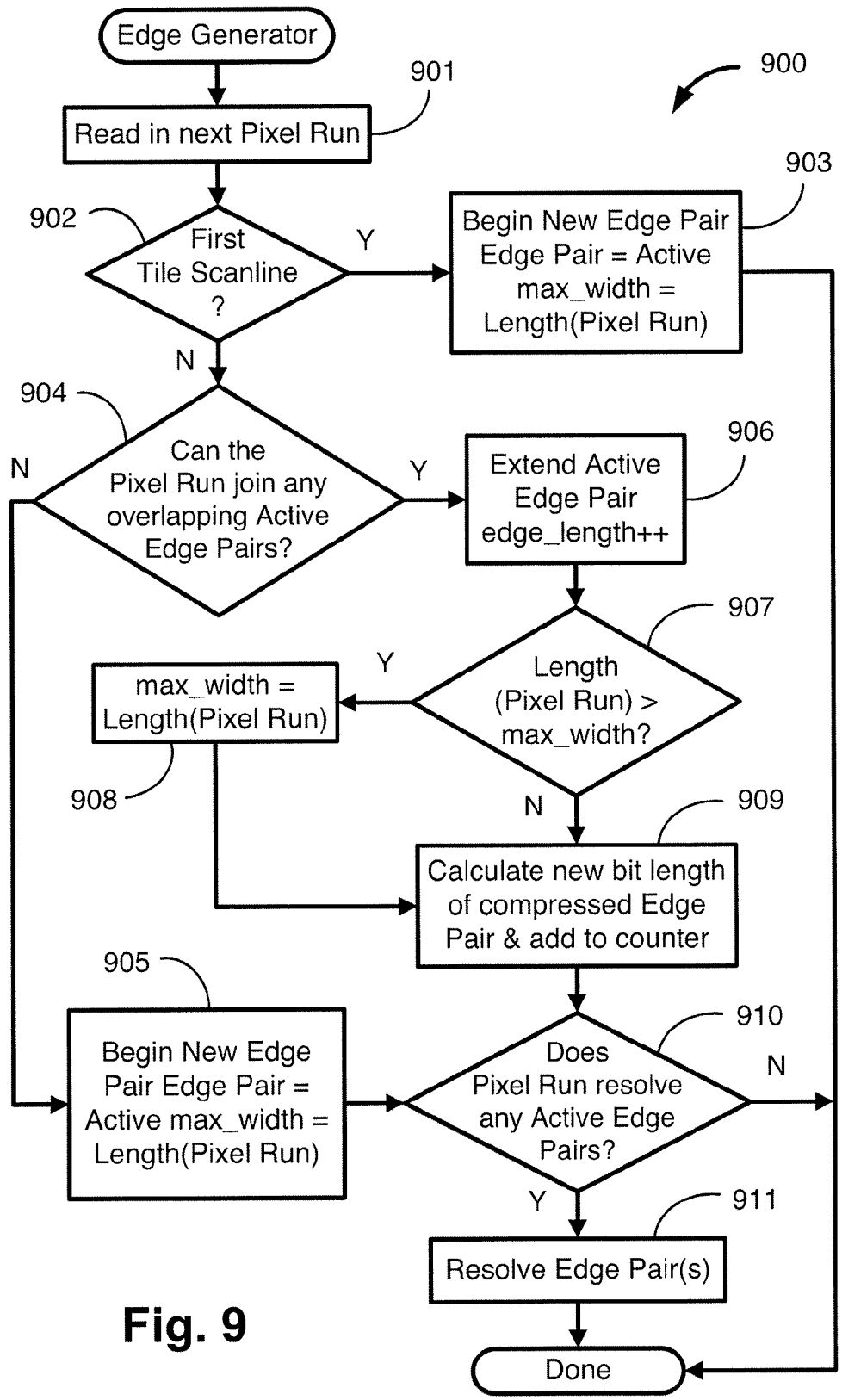
FIG. 9 shows a schematic flow diagram of a method for generating edges from pixel runs, as used in the method of FIG. 5A.

As described above with reference to FIG. 5A, the Edge Generator 405 executes step 900 until the entire tile has been processed. FIG. 9 shows a schematic flow diagram of step 900 performed by the Edge Generator 405. Step 900 starts in step 901 where pixel runs 403 are read into to the Edge Generator 405, one by one, as they are created within the tile by the Pixel Run Generator 402. If it is determined in step 902 that the pixel run 403 occurs on the first scanline of a tile the Edge Generator 405 proceeds to step 903 where a new edge pair is created. This edge pair is set to active and the length of the pixel run is recorded as the max_width. The compressed edge pair bit length counter is initialised. Following step 903, the step 900 ends.

Alternatively, if it is determined in step 902 that the pixel run 403 occurs on a subsequent tile row, then the pixel run 403 is examined in step 904 to determine whether or not the pixel run 403 can join any existing active edge pairs. If it is determined that the pixel run cannot join any of the existing active edge pairs the Edge Generator 405 proceeds to step 905 where a new edge pair is created. This edge pair is set as active and the length of the pixel run recorded as the max_width. The compressed edge pair bit length counter is initialised.

Alternatively, if it is determined in step 904 that the pixel run 403 can join an overlapping active edge pair, then the Edge Generator 405 proceeds to step 906 where the active edge pair is extended by that pixel run 403 and the edge_length counter is incremented. Following step 906 the length of the pixel run is compared in step 907 with the existing value for max_width. If the length of the pixel run is less than the value of max_width, the Edge Generator 405 proceeds to step 909. If the length of the pixel run is greater than the value of max_width, then max_width is set to the length of the pixel run in step 908 before the Edge Generator 405 proceeds to step 909.

In step 909 the Edge Generator 402 calculates the number of bits that will be required to compress the new X-offsets for the enabling and disabling edges and adds this value to the compressed edge pair bit length counter. In step 910 it is then determined whether the pixel run 403 extends past other active edge pairs within the tile therefore precluding them from continuing. If this is the case the edge pairs so affected are resolved and set as 'inactive' in step 911 before the step 900 ends. Alternatively, if the pixel run 403 does not resolve any active edge pairs the step 900 ends.

Figure 11:
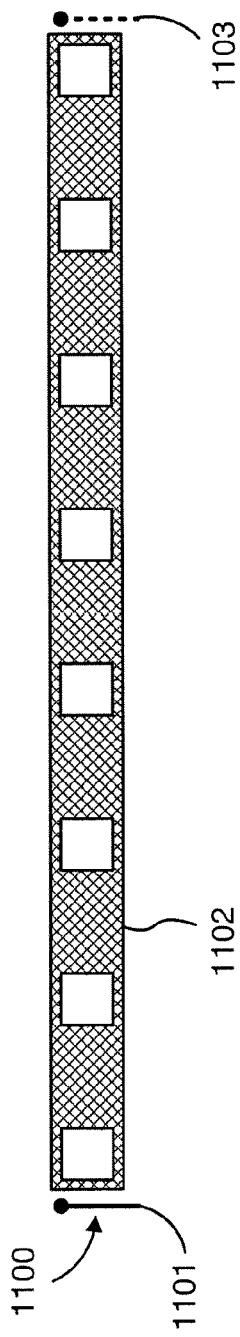
FIGS. 11 to 17 illustrate edge generation according to the method of FIG. 9 by way of an example.

FIGS. 11 to 17 illustrate by way of example the generation of edges from the subset of pixels 600 shown in FIG. 6, and the pixel runs shown in FIG. 8. A first scan line 1100 is shown in FIG. 11. The first pixel run 1102 initiates the first enabling edge 1101 of the pixel run 1102 and the first disabling edge 1103 of the pixel run 1102. A pixel run 1102 on the first scan line 1100 of a tile always results in a new edge being generated. The first scan line 1100 always has an enabling edge 1101 at the beginning of the scan line 1100 (at X=0 and Y=0) and a disabling edge 1103 at the end of the scan line 1100. However, the enabling edge 1101 at the beginning of the scan line 1100 and the disabling edge 1103 at the end of the scan line 1100 do not necessarily form a pair.

Figure 12:
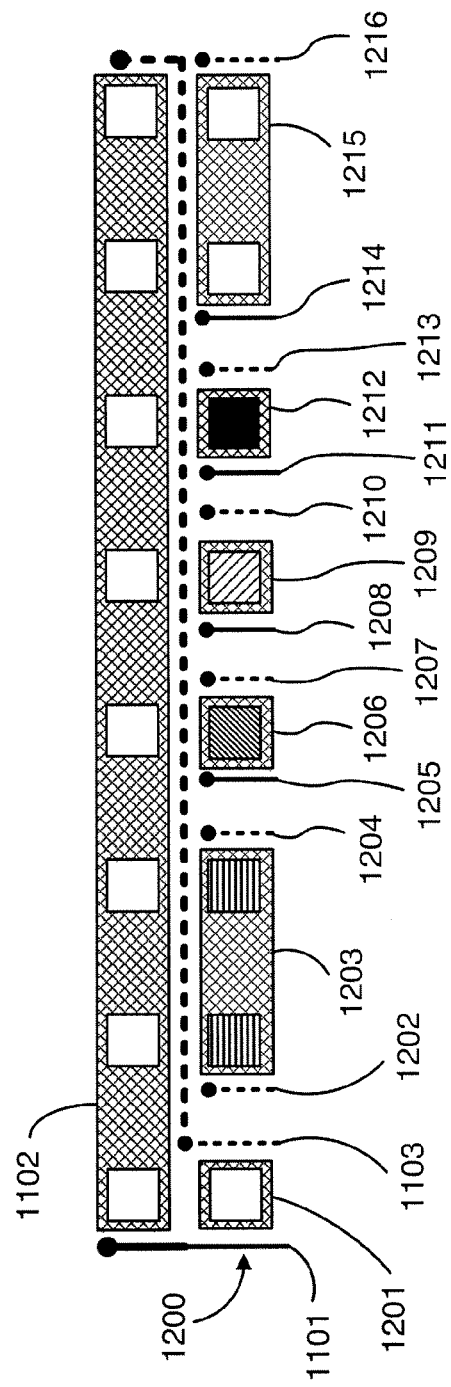

FIG. 12 shows the first enabling edge 1101 and disabling edge 1103 being continued to the next scan line 1200 at X=0 and X=1 respectively due to the overlap and similarity in color values between pixel run 1201 and pixel run 1102. New enabling edges 1202, 1205, 1208, 1211, and 1214 and new disabling edges 1204, 1207, 1210, 1213, and 1216 are created for pixel runs 1203, 1206, 1209, 1212, and 1215 respectively.

Figure 13:
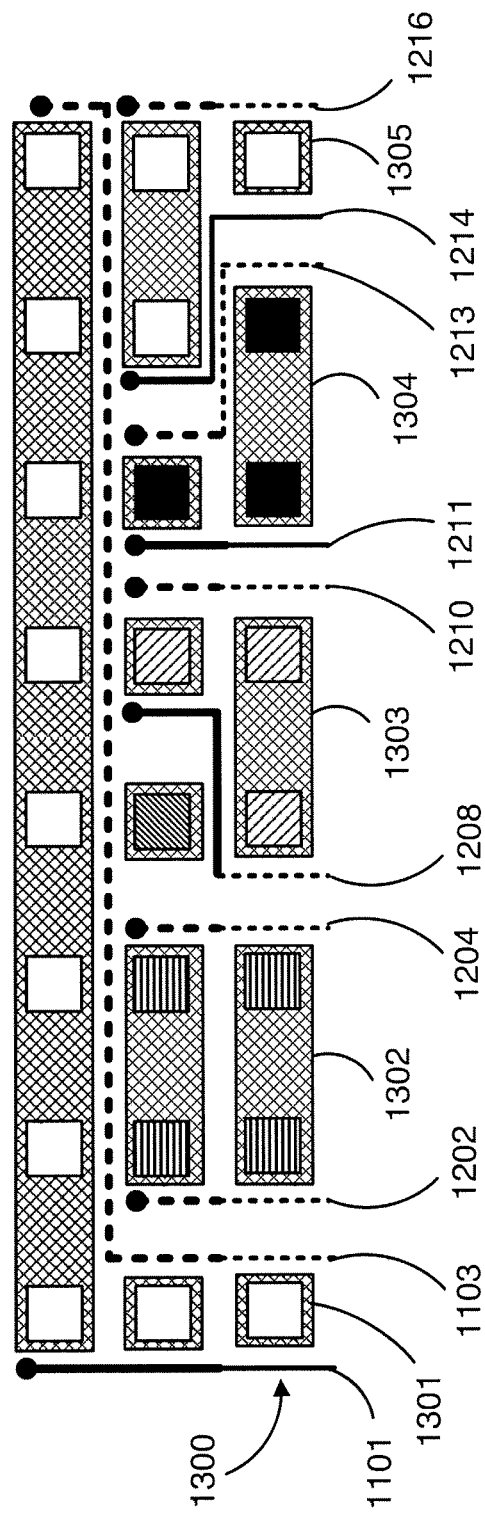

FIG. 13 shows the continuation of enabling edges 1101, 1202, 1208, 1211, and 1214 and disabling edges 1103, 1204, 1210, 1213, and 1216 to the next scan line 1300. Enabling edge 1205 (FIG. 12) and disabling edge 1207 (FIG. 12) have been resolved since there are no overlapping pixel runs on the current scan line 1300 that can join edge pair 1205-1207 (FIG. 12). Enabling edge 1205 and disabling edge 1207 have also been discarded as this edge 1205, and its corresponding disabling edge 1207, did not meet assessment criteria for an edge pair to be retained.

Figure 14:
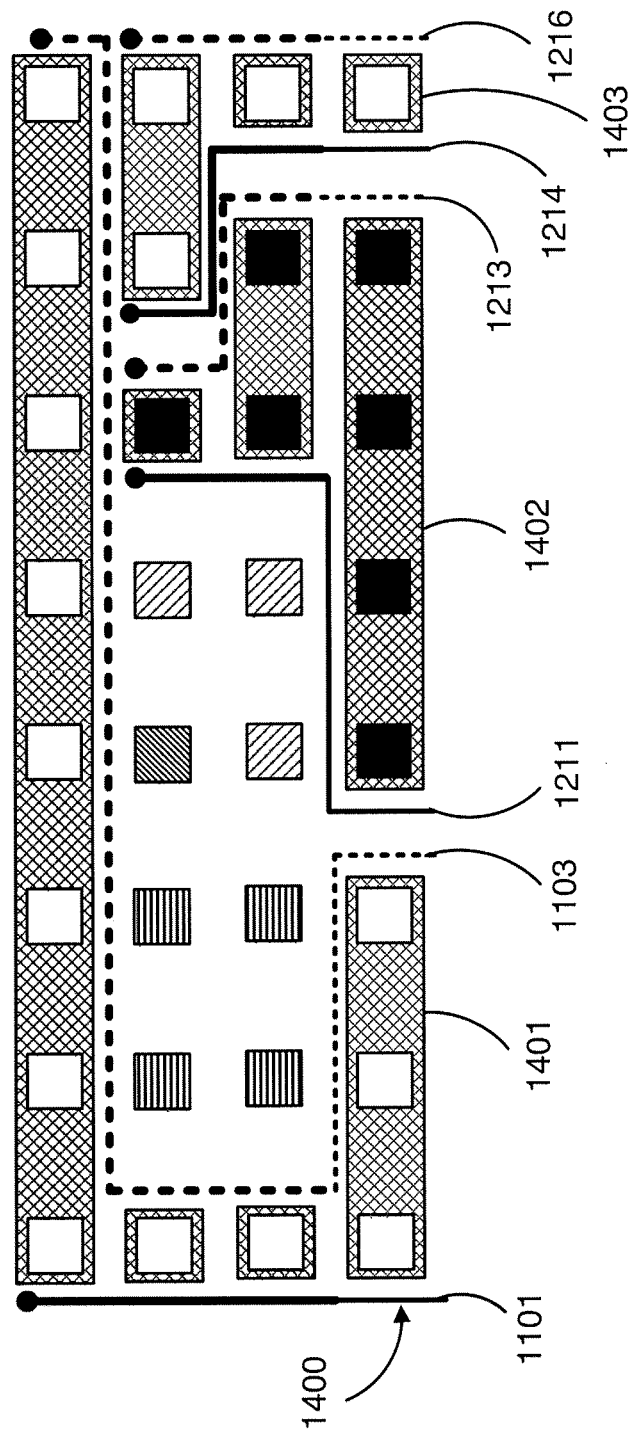

FIG. 14 shows the continuation of enabling edges 1101, 1211, and 1214 and disabling edges 1103, 1213, and 1216 to the next scan line 1400 as further pixel runs 1401, 1402, and 1403 overlap and join these edges from the previous scan line 1300. Enabling edges 1202, and 1208 (FIG. 13) and the corresponding disabling edges 1204, and 1210 (FIG. 13), have been resolved since there are no overlapping pixel runs on the current scan line 1400 that can join the pixel runs associated with those edge pairs. Further, enabling edges 1202, and 1208, and their corresponding disabling edges 1204, and 1210, have been discarded as they did not meet the assessment criteria for an edge pair to be retained.

Figure 15:
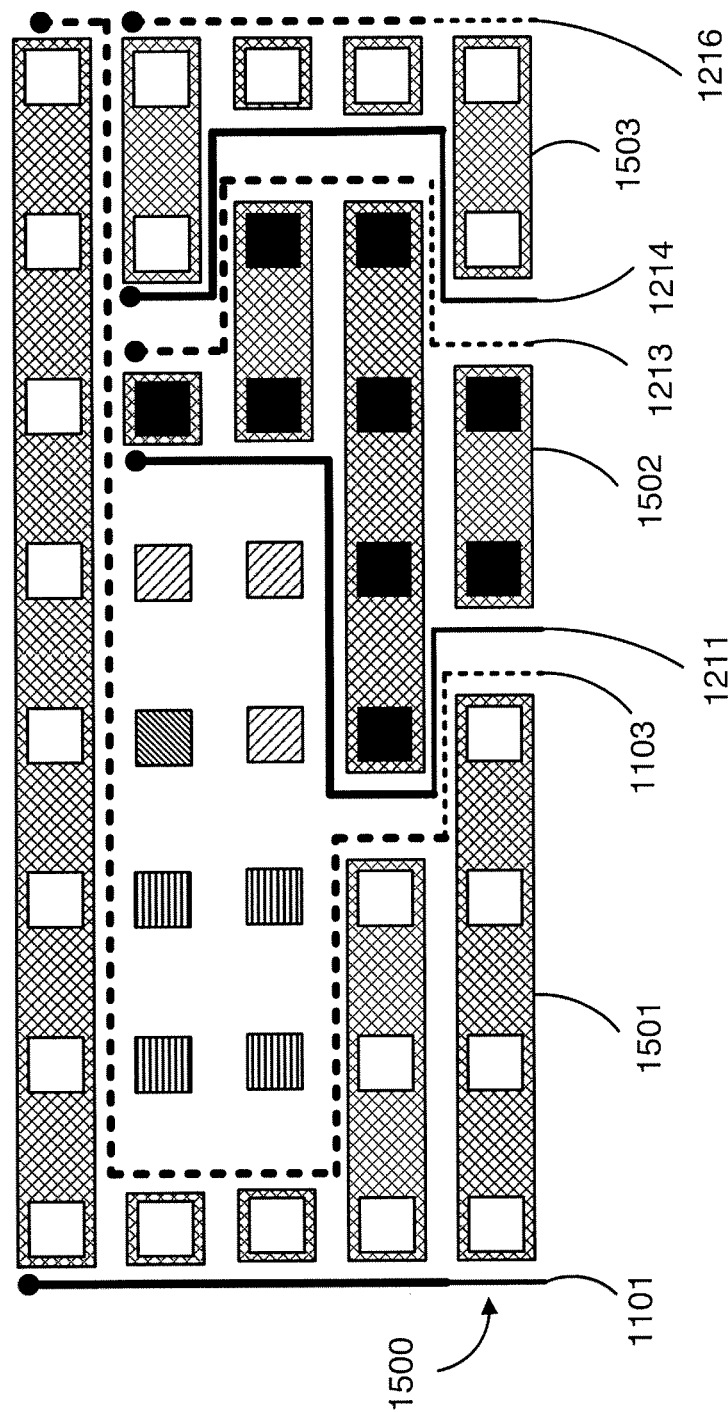

FIG. 15 shows the continuation of enabling edges 1101, 1211, and 1214, and disabling edges 1103, 1213, and 1216, to the next scan line 1500 as further pixel runs 1501, 1502, and 1503 overlap and join the edges from the previous scan line 1400.

Figure 16:
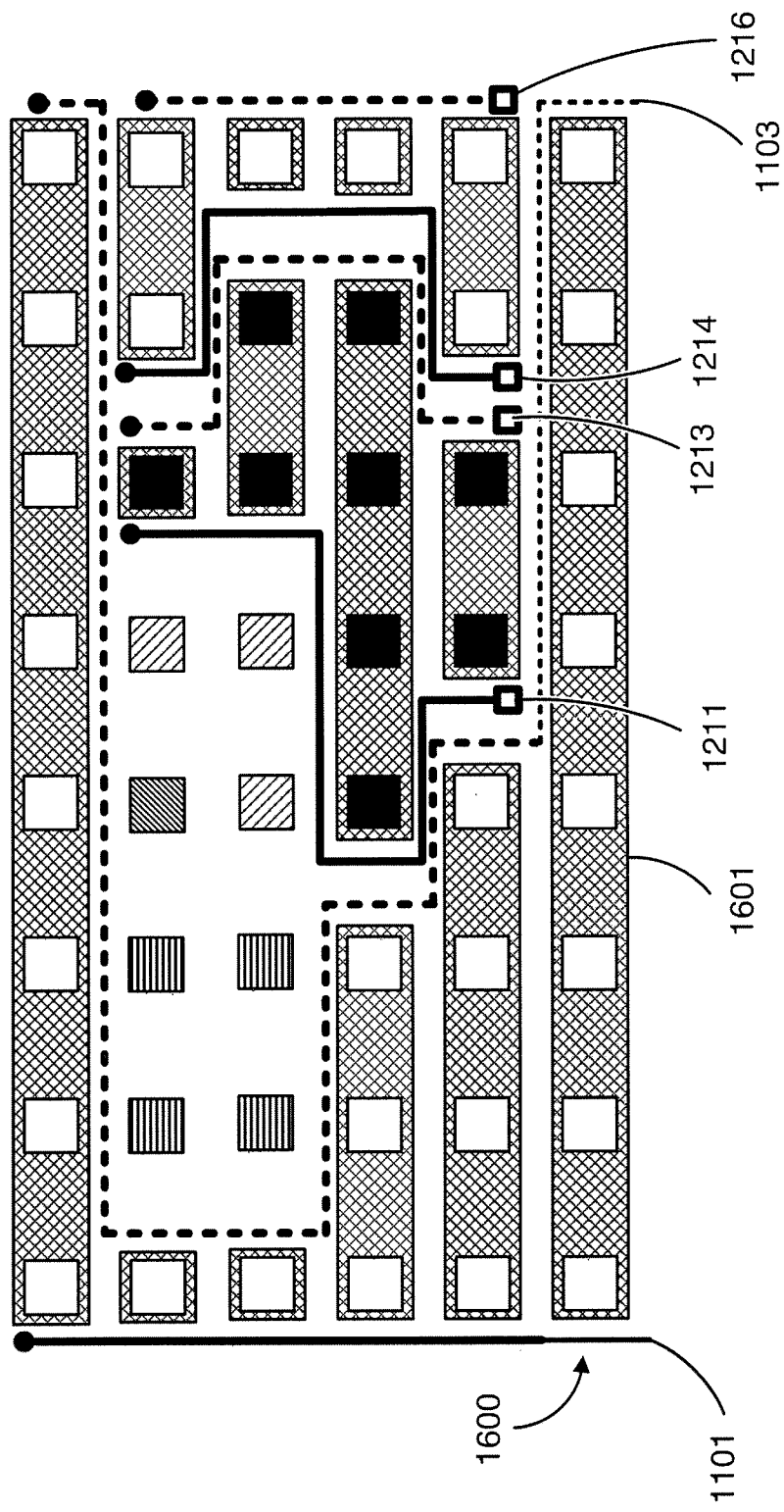
Figure 17:
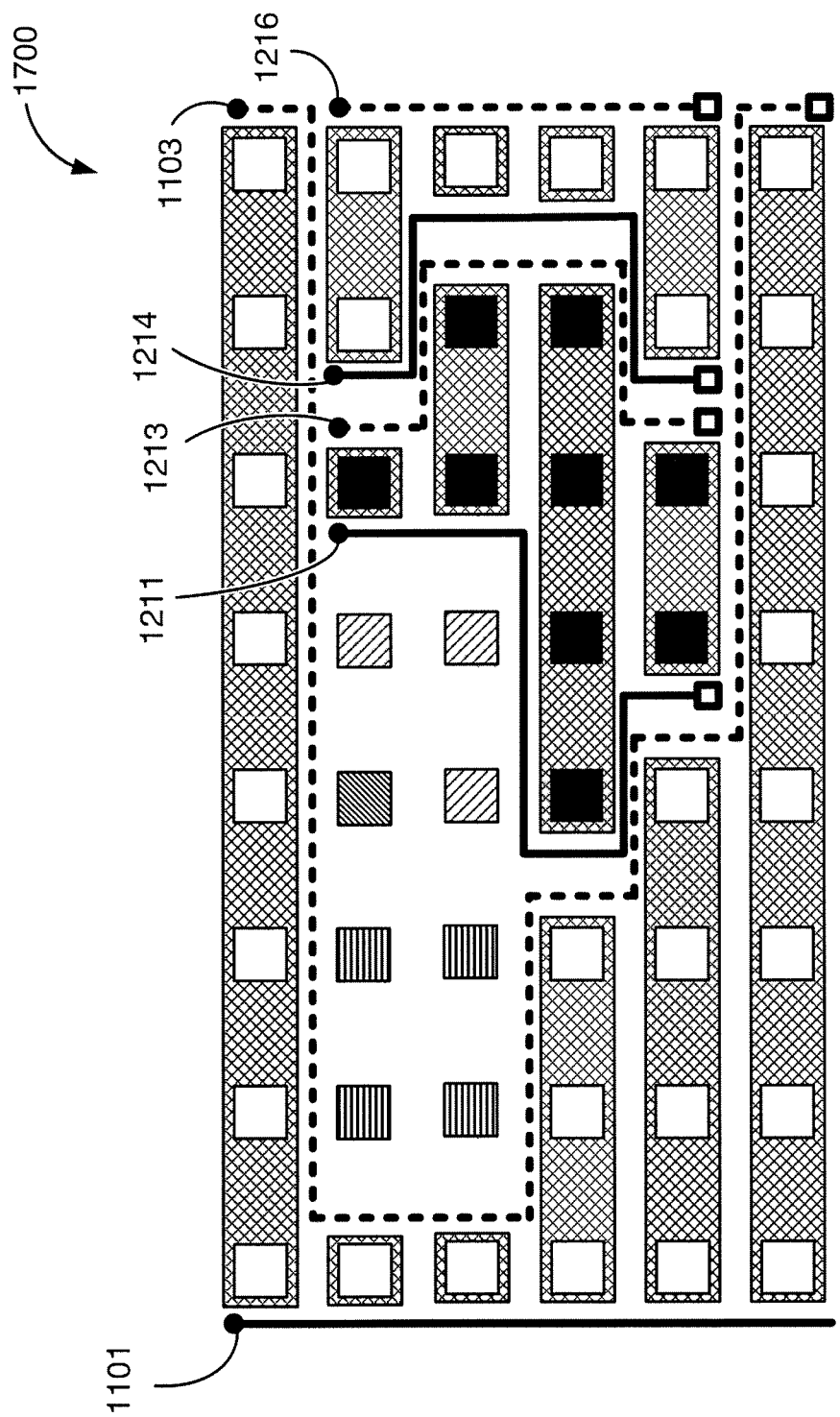

FIG. 16 shows the last scan line 1600 of pixels in the example tile. Enabling edge 1101 and disabling edge 1103 are continued by pixel run 1601, but enabling edges 1211, and 1214, and the corresponding disabling edges 1213 and 1216 are resolved. These edges, however, are retained as they passed the assessment criteria for an edge pair to be retained. FIG. 17 shows the complete tile 1700, together with all the enabling edges 1101, 1211 and 1214, and corresponding disabling edges 1103, 1213 and 1216 that met the assessment criteria. The eight pixels from runs 1203, 1206, 1209, 1302, and 1303 not spanned by any retained edge pair are the image pixels for the tile 1700.

Edge Assessment

Figure 18:
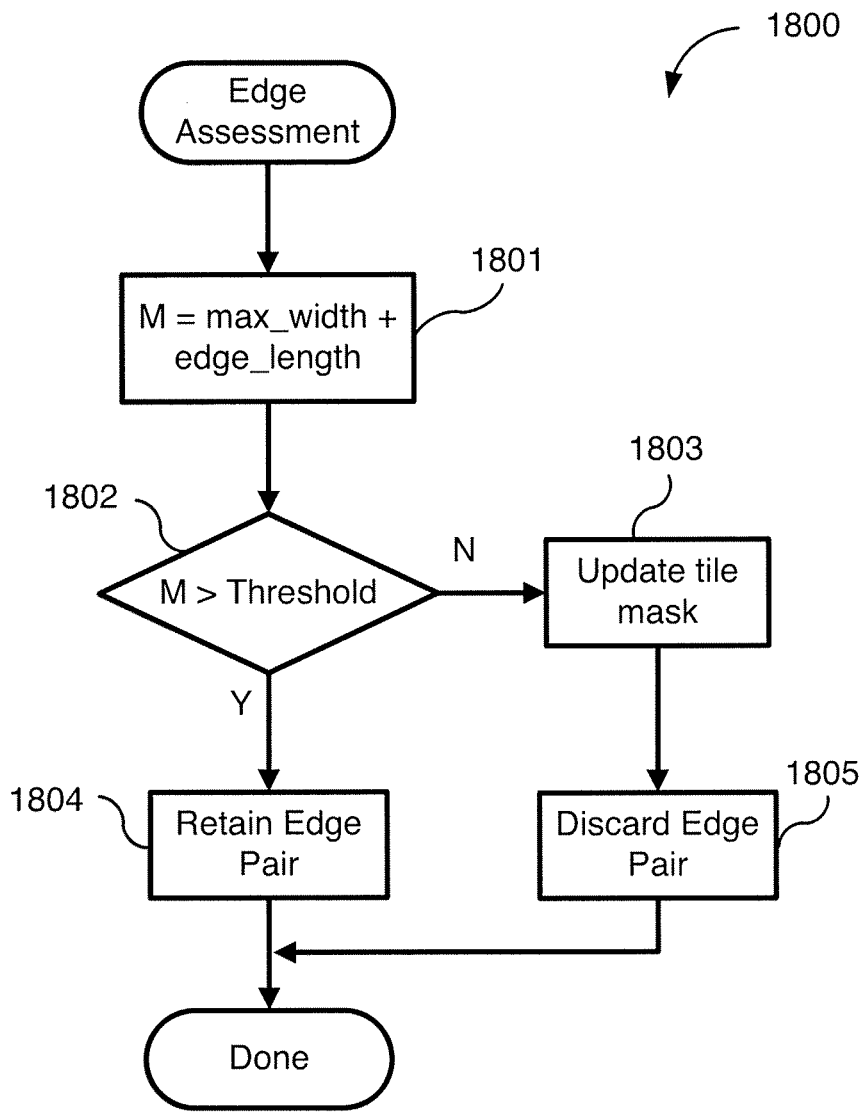
FIG. 18 shows a schematic flow diagram of a method for assessing edges, as used in the method of FIG. 5A.

Edge assessment is performed by the Edge Assessor 406 (FIG. 4) to assess the visual significance of edge pairs. If an edge pair is visually significant that pair is considered to be a flat region edge. Otherwise, the edge pair is considered to be visually insignificant and is discarded. The Edge Assessor 406 uses a combination of the maximum width of the flat region defined by the edge pair and the edge pair length to assess the visual significance of an edge pair. FIG. 18 shows a schematic flow diagram of the edge assessment process 1800 performed during steps 515 and 518 of method 500 (FIG. 5A). Process 1800 considers the length of the edge pair in the y direction, stored in the edge pair data structure as edge_length, along with the maximum width of the flat region defined by the edge pair, stored in the edge pair data structure as max_width. These two values are added together in step 1801 to form a visual significance metric M for edge pair assessment. Typically, for an edge pair to be accepted the value of the visual significance metric M should be greater than approximately 8-10% of the perimeter of the tile. For example, in a tile of dimensions 64 pixels by 64 pixels an acceptable threshold value of the metric M would be 20. Accordingly, step 1802 determines whether the visual significance metric M for the edge pair is greater than the threshold. If visual significance metric M for the edge pair is determined to be greater than the threshold the 'valid' edge pair data is retained in step 1804 before the process 1800 ends. Alternatively, if the visual significance metric M for the edge pair is less than the threshold the edge pair is deemed insignificant, and the process 1800 proceeds to step 1803 where the Bit Mask Generator 408 updates the tile bitmask to reflect the positions within the tile of the pixels previously belonging to the now discarded edge pair region. The edge pair data is then discarded in step 1805 and the slot it occupied in the edge pair data structure is freed. Following step 1805 the process 1800 ends.

Edge Compression

As shown in FIG. 17, once the tile 1700 has been completely processed by the Edge Generator 405 and any edges generated assessed by the Edge Assessor 406, a final set of valid edge pairs (1101, 1103), (1211, 1213) and (1214, 1216) are created. The raw data associated with the valid edge pairs are stored in an edge pairs array. This raw data is losslessly compressed by the Edge Compressor 410 (FIG. 4).

The Edge Compressor 410 compresses the edge data using a lossless compression method, creating a lossless data bitstream 2303 (FIG. 22) that is passed to the Compressed Data Memory Manager 419 (FIG. 4).

If the Colour Palette 413 buffer hasn't overflowed then, depending on which method offers the best compression, there is an option to encode the colour data associated with each edge pair as a colour palette index or as a raw colour value. This decision, made in step 574 (FIG. 5D) of Compression Path Type 3 (570) and step 582 (FIG. 5E) of Compression Path type 4 (580), is dependent on the bit depth of the colour, the maximum number of colours able to be stored in the Colour Palette buffer 413, and the number of edge pairs (or in the case of no image pixels, enabling edges) contained within the tile. The inequality $C_r < C_i$ that is used in steps 574 and 582 to determine whether to encode the edge pairs/enabling edge colour values as a colour palette index or as a raw colour value is equivalent to the following inequality:

$$E_N < \frac{BN}{B - \log_2 N} \qquad (2)$$

where $E_N$ is the number of edge pairs/enabling edges, B is the bit depth of the colour value of the flat pixels and N is the maximum number of colour values able to be stored in the Colour Palette buffer 413. Note that the right side of inequality (2) is a constant so it reduces to a simple comparison of the number of flat regions with a threshold. If inequality (2) is satisfied then encoding the colour value for an edge pair/enabling edge as a colour palette index is less efficient than encoding as a raw colour value. Otherwise the colour palette is written to the tile header 2302 (FIG. 22) followed by the colour palette index corresponding to each edge pair/enabling edge. The colour palette indices are written to the tile header 2302 in the same order as the edge pairs/enabling edges were generated in the tile. There is a one to one correspondence between the number of colour palette indices and the number of edge pairs/enabling edges.

Alternatively, if it is more efficient to encode the colour data as raw values the raw colour values corresponding to each edge pair/enabling edge are written to the tile header 2302. The raw colour values are written in the same order as the edge pairs/enabling edges were generated in the tile. There is again a one to one correspondence between the number of raw colour values and the number of edge pairs/enabling edges.

Since the edge pairs are tile based, a fixed number of bits can be used to code the (X, Y) start positions and number of x-offsets. For example, in a tile size of 64 by 64 pixels, 6 bits are required to code the start positions and number of x-offsets, i.e. edge_length. The offset data can be coded using an entropy based encoding method similar to that used by JPEG for encoding DC coefficients. In this method the edge offsets are represented by symbol pairs; symbol-1 and symbol-2. Symbol-1 represents the size information and symbol-2 represents amplitude information. Symbol-1 is encoded with a variable length code, generated from a suitable Huffman table. Symbol-2 is encoded as a 'variable-length integer' whose length in bits is stored in the preceding variable length code. The Huffman codes and code lengths are specified externally and are known to both the compressor and the decompressor.

Palette Compression

The Palette Processor 411 (FIG. 4) comprises the Palette Generator 412, the Colour Palette buffer 413, the Palette Map buffer 414 and the Palette Compressor 415.

The Palette Generator 412 is responsible for maintaining the Colour Palette buffer 413, the Palette Map buffer 414 and pre-calculating the expected compressed and uncompressed bit lengths of the colour palette and palette map.

The Colour Palette buffer 413 is an array of distinct colours that are used in the tile. As each new colour is added, the colour palette is checked for a duplicate colour first. If no duplicate exists, the new colour is added to the Colour Palette buffer 413. The position of this colour within the Colour Palette buffer 413 indicates the Colour Palette index. There are a finite number of colours that can be added to the colour palette before the Colour Palette buffer 413 overflows. The maximum number of array elements N available in the Palette Colour buffer 413 (the palette size) ideally should be small (around 4 to 16) to reduce the processing overhead that occurs in a large colour palette due to the many colour comparisons that must be carried out. The maximum number of array elements N is also preferably a power of 2 to get the most efficient usage of the $\log_2 N$ bit-per-pixel index that is stored in the Palette Map buffer 414. The Palette Map buffer 414 contains a Palette Colour Index entry for every pixel, arranged in tile raster order. Each entry in the Palette Map buffer 414 is therefore a $\log_2 N$ bits-per-pixel code where N is the maximum number of colours in the Colour Palette buffer 413.

The Palette Compressor 415 in step 563 (FIG. 5C) compresses the contents of the Palette Map buffer 414 using a basic run-length encoding method. Preferably this run-length coding method is kept simple. For example, a fixed length run encoding method may be utilised whereby a run code of fixed bit length is followed by the palette colour index. For example, for a tile size of 64 by 64 pixels the run code is fixed at 4 bits, allowing for a run of up to 15 pixels of the same colour palette index. The run code is immediately followed by the colour palette index. In the Hybrid Compressor 304 (FIG. 4) of the preferred embodiment the maximum number of unique colours stored in the Colour Palette buffer 413 is 8. Thus, 3 bits are required to code the colour palette index. In the case the pixel run is longer than 15 then a special 'follow on' code 0 indicates to a decompressor (which is described below with reference to FIG. 20) to read a further 4 bits of run length and increment the run length by 16 and continue to do so until a run length code greater than zero is encountered, therefore indicating the run has terminated and the 3 bit colour palette index can be read. This simple method of encoding also ensures that it is straightforward to calculate the compressed palette bit length as each pixel run within the tile is processed and the palette map is updated. Since the uncompressed palette map size can also be predicted as $\log_2 N$ times the tile size in pixels, in the event where the compressed palette bit length exceeds that of the uncompressed palette map bit length, the uncompressed palette map can be written (as in step 564) to the lossless data bitstream 2303 for storage in the Compressed Data Memory Manager 419. For example, for a 64 by 64 pixel tile with the colour palette having a maximum of 8 colours the uncompressed palette map size=64×64×3 bits=1.5 kbytes.

Image Compression

The Image Processor 416 (FIG. 4) comprises a Bitmask Processor 417 and an Image Compressor 418.

If the bitmask contains all "true" values, then the entire tile contains image pixels and is preserved in as high a quality as the image compression algorithm allows. The bitmask will only contain all "true" values if all edge pairs have been assessed as insignificant and the Colour Palette buffer 413 has overflowed, resulting in compression path type 1 to be executed in step 550 (FIG. 5A). If the bitmask contains some "false" values, then there are some non-image (flat) pixels that do not need to be compressed using the Image Processor 416 and compression path type 5 is executed in step 590 (FIG. 5A) which overwrites the non-image pixels to make the task of the Image Processor 416 easier.

Image pixels passed to the Image Processor 416 may contain sharp edges where flat pixels are adjacent to image pixels. In an image compression algorithm, such as JPEG, these sharp edges usually result in larger file sizes due to the increased magnitude of high is frequency data. Sharp edges also cause visible artefacts known as "ringing". A method known as 'backfilling' is preferably utilised to minimise both file size and visible artefacts within the tile. For example, only the image pixels as indicated by the bitmask need to be preserved, while all other pixels within the tile can be modified since their values are losslessly encoded elsewhere. Image pixel values within a tile can be extrapolated, based on the colour values of neighbouring pixels, as needed, to the edges of the tile overwriting any flat pixels. The preferred method of backfilling takes into account whether the non-image pixels are bounded on two sides, either horizontally or vertically, by image pixels. If so, the non-image pixels are one-dimensionally linearly interpolated from the bounding image pixels. Otherwise, the non-image pixels are extrapolated by replicating such pixels with their nearest neighbouring image pixel. This backfilling reduces the artefacts of the sharp edges that usually occur between blocks of pixels. Other methods of backfilling may also be utilised.

An important benefit offered by the Hybrid Compressor 304 of the preferred embodiment is that the output compressed data size is a guaranteed fit to a pre-determined memory size. To achieve this, the lossy image compression method used must have the ability to partition the data for a tile into most visually perceptible to least visually perceptible elements. This allows the least visually perceptible elements to be discarded without significant errors in the resulting image, resulting in a guaranteed-fit output in one pass. In other words, the output is guaranteed to be smaller than some pre-determined size. By discarding the least visually perceptible, or significant, elements, memory is made available for use by the remaining portion of the page in a way that maximises the quality of the decompressed pixels. The partitioning scheme is consistent over all tiles in the page, so elements from different tiles at the same level of visual significance can be notionally linked to form a partition of uniform visual significance. Since each such partition contains data pertaining to multiple (preferably all) tiles in the page, it is possible to uniformly degrade the quality across portions (preferably the whole) of the page by discarding such partitions in ascending order of visual significance. This is an important distinction between this method and many other methods of guaranteed-fit compression. Most other methods either discard information from the current tile or simply increase the compression strength for future tiles. This can result in visually perceptible changes in quality across the page. A particular mixture of the progressive modes of successive approximation and spectral approximation is used by the Hybrid Compressor 304 of the preferred embodiment.

The Image Compressor 416 preferably utilises a progressive mode of JPEG suited to arranging lossy compressed image data into most visually perceptible to least visually perceptible elements. The progressive mode JPEG compression schemes utilise a discrete cosine transform (DCT) to transform integer pixel values to integer transform coefficients. The DCT typically operates on 8 by 8 pixel blocks on a colour channel by colour channel basis. The resulting transform coefficients are quantized and arranged in JPEG ziz-zag order. The transformed coefficients are split into multiple bitstreams representing visually significant partitions. This is achieved by encoding spectral bands of transform coefficient bitplanes separately. For example, the DC partition is the most visually important coefficient and is coded into the most visually significant partition. This DC partition is followed by the next most visually significant partition comprising of grouped upper (most significant) bitplanes of spectral bands of AC coefficients. Finally, each of the remaining lower (least significant) bitplanes of the spectral bands are separately partitioned. Each of the bitstreams corresponding to these visually significant partitions are encoded losslessly using a suitable Huffman entropy encoder.

Guaranteed Fit

The method 500 (FIG. 5A) performed by the Hybrid Compressor 304 is not a greedy algorithm in that it does not attempt to consume a set amount of memory for each tile. There is no set amount of memory defined for each tile. The tile simply uses memory set aside for the entire page. If and when there is no more page memory available, then the least visually perceptible data is discarded from all tiles by the Compressed Data Memory Manager 419 in order to release memory. This global discardability is what enables the method 500 to offer a guaranteed fit in one pass.

By discarding the least visually perceptible elements, memory is made available for use by the remaining portion of the page. Since each partition contains data pertaining to the entire page, it is possible to uniformly degrade the image quality across the entire page. This is an important distinction between this method and many other methods of guaranteed-fit compression.

Decompression

Decompression is carried out, on a tile by tile basis, in the reverse of the flat region/image compression order. In compression, flat region data is determined first by Edge Processor 404 and encoded using either the Edge Compressor 410 or the Palette Compressor 415. The remaining image data, if any, is compressed by the Image Processor 416. In decompression, image data, if any, is decompressed first followed by any flat region data.

Figure 20:
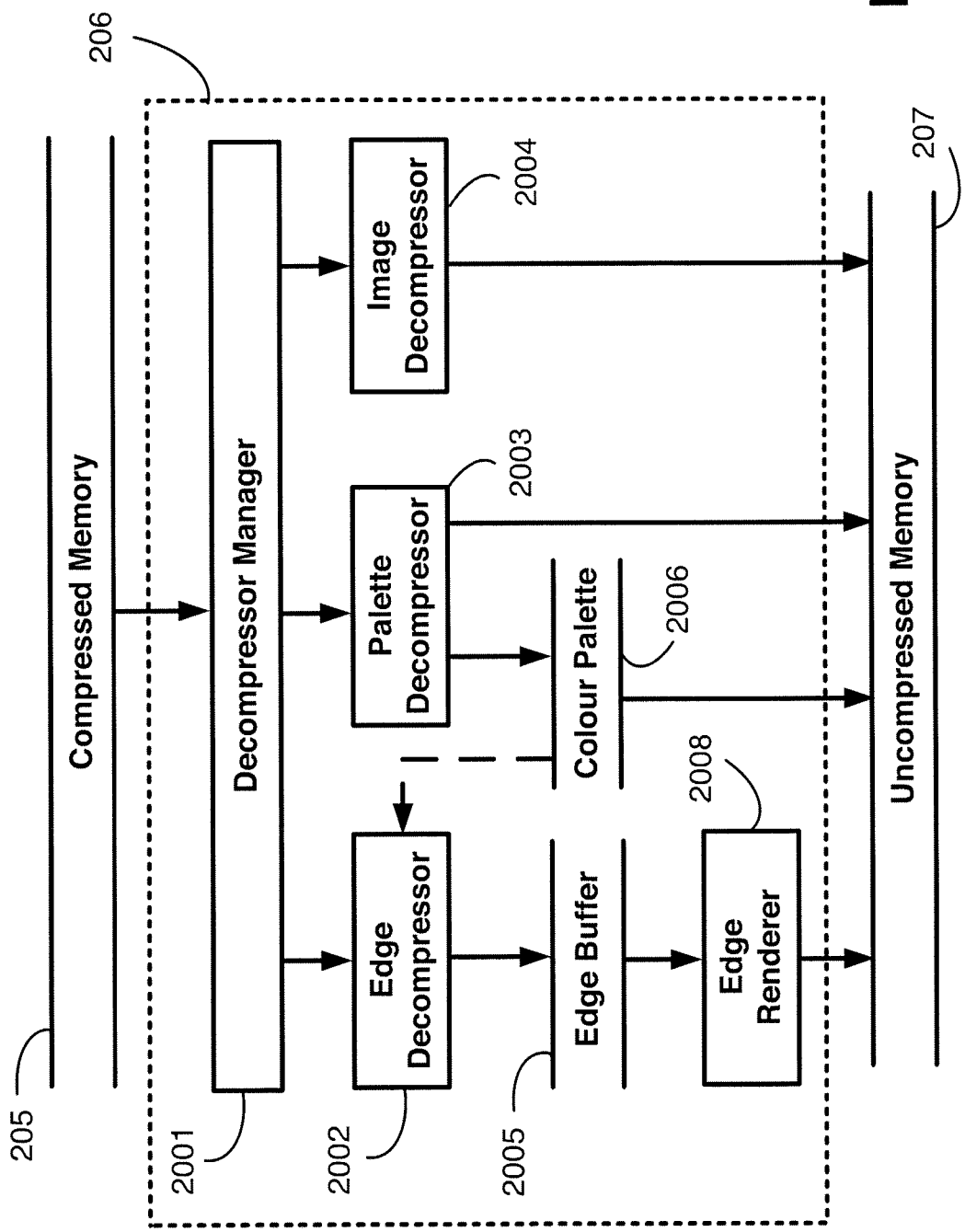
FIG. 20 shows a schematic block diagram of a hybrid decompression apparatus as used in the systems of FIGS. 2 and 3 according to the preferred embodiment of the present invention.

FIG. 20 shows a schematic block diagram of a Hybrid Decompressor 2000, complementing the hybrid compressor 304, and usable as the RIP Output Decompressor 206 in FIGS. 2 and 3. The Hybrid Decompressor 2000 comprises a Decompressor Manager 2001, an Edge Decompressor 2002, an Edge buffer 2005 for storing decompressed edge data, a Palette Decompressor 2003, a Colour Palette buffer 2006, an Image Decompressor 2004, and an Edge Renderer 2008.

The Decompressor Manager 2001 locates the bitstreams in the Compressed RIP Output in the compressed memory 205 and supplies those to decompressors 2002, 2003, and 2004 as required. The Decompressor Manager 2001 reads the compression path type and any flags required by the compression path from the tile header 2302 and determines which decompressors 2002, 2003 and 2004 need to be utilised to reconstruct the tile.

The Edge Decompressor 2002 recovers compressed edge data from the lossless data bitstream 2303 and decompresses the edge data. The Edge Decompressor 2002 also reads image pixel values that have been stored losslessly using Compression Path type 4. The resulting decompressed edges are stored in the Edge Buffer 2005 prior to rendering. In particular, the edges are stored in the Edge Buffer 2005 in the same order as which they were read; this ensures the edges appear in correct tile order. The Edge Renderer 2008 uses the edge data stored in the Edge Buffer 2005 to render flat pixels into the tile. In the case where image pixel values have been stored losslessly using Compression Path type 4 using step 580, the Edge Renderer 2008 also determines gaps on a tile row between a disabling edge and the next enabling edge and renders the recovered image pixels.

The Image Decompressor 2004 receives the compressed image data from the Decompressor Manager 2001 and reconstructs the image data. The image decompressor 2004 comprises a partition manager for recovering compressed image data from each visually significant lossy bitstream 2304 to 2305, Huffman entropy decoders for decoding each of the bitstreams and an inverse DCT unit for combining the partitions into a block of transform coefficients and for performing a discrete inverse cosine transform on the decoded block.

The Palette Decompressor 2003 reads colour data from the tile header 2302 and reconstructs and stores the colour palette 2006 in a Colour Palette buffer 2006. The Palette Decompressor 2003 also decompresses the Palette Map. The colour palette data from the buffer 2006 is also passed to the Edge Decompressor 2002, if required.

The operation of the Hybrid Decompressor 2000 is now described. The Decompressor Manager 2001 reads the tile header 2302 and retrieves the tile Compression Path type and flags.

If the Compression Path type is 1 then the Image Decompressor 2004 decompresses the data from the Compressed RIP Output bitstreams and fills the Uncompressed Memory 207 with the image pixels.

If the Compression Path type is 2 the Palette Decompressor 2003 processes the encoding type flag and determines whether the Palette Map has been stored in compressed or uncompressed format. The Palette Decompressor 2003 then reads the Colour Palette data and fills the Colour Palette buffer 2006, in order, with raw colour values. Then, depending on the encoding type flag, the Palette Decompressor 2003 either decodes the runs of pixel colour indices or directly reads raw pixel colour indices until a run of pixel colour indices is completed. The Palette Decompressor 2003 then determines the pixel values of these runs using the colour palette and renders the pixels into the Uncompressed Memory 207.

If the Compression Path type is 3 then the Edge Decompressor 2002 processes the encoding type flag to determine if the data has been encoded using palette compression or edge compression. If the data has been compressed using palette compression the Palette Decompressor 2003 decompresses the palette following the Path Type 2 decompression method described above. If the data has been compressed using edge compression then the colour encoding flag is processed. The colour encoding flag indicates if enabling edge colour values associated with the enabling edges have been stored as colour palette indices or as raw colour values. If the enabling edge colour values have been stored as colour palette indices then the Palette Decompressor 2003 reads the Colour Palette 2006 and supplies the enabling edge colour values to the Edge Decompressor 2002 which reads the colour indices one by one and, referencing the colour palette for the colour value, stores each colour value in the corresponding Edge Buffer 2005 array slot. If the enabling edge colour data has been stored as raw colour values then the Edge Decompressor 2002 reads the colour values one by one and stores each colour value in the corresponding Edge Buffer 2005 array slot. The Edge Decompressor 2002 then reads, decompresses and stores the enabling edge data in the Edge Buffer 2005. When all enabling edges have been decompressed the Edge Renderer 2008 renders the regions of flat pixels described by the enabling edges into the Uncompressed Memory 207.

If the Compression Path type is 4 then the Edge Decompressor 2002 processes the encoding type flag to determine if the data has been encoded using palette compression or edge compression plus uncompressed image pixel values. If the data has been compressed using palette compression the Palette Decompressor 2003 decompresses the palette following the Path Type 2 Decompression method described above. If the data has been compressed using edge compression plus uncompressed image pixel values then the colour encoding flag is processed. The colour encoding flag indicates if edge colour values associated with the edge pairs and image pixel colour values have been stored as colour palette indices or as raw colour values. If the colour values have been stored as colour palette indices then the Palette Decompressor 2003 reads the colour palette from the Colour Palette buffer 2006 and supplies the edge pair colour values to the Edge Compressor 2002. The Edge Compressor 2002 then reads, decompresses and stores the edge pair data in the Edge Buffer 2005.

It is noted that since there are image pixels in the tile, both enabling and disabling edges are required to define the flat pixel regions. When all edge pairs have been decompressed the Edge Renderer 2008 renders the regions of flat pixels described by the enabling edges into the Uncompressed memory 207. Any gaps that occur in a tile row that are not accounted for by flat pixel regions are filled with image pixel values supplied by the Edge Decompressor 2002. The Edge Renderer 2008 determines the number of pixels required to fill the gap and requests the values from the Edge Decompressor 2002. The Edge Decompressor 2002 reads the image pixel colour palette index values and, using the Colour Palette, supplies raw colour values to the Edge Renderer 2008. If the colour values have been stored as raw colour values Edge Decompressor decompresses and renders the edge pair data as described above. As described above any gaps that occur in a tile row that are not accounted for by flat pixels are filled with image pixel values supplied by the Edge Decompressor 2002.

If the Compression Path type is 5 then the Image Decompressor 2004 first decompresses the data from the Compressed Memory 205 and fills the Uncompressed memory 207 buffer with image pixels. The Edge Decompressor 2002 then decompresses the edge pair data as described above. When all edge pairs have been decompressed the Edge Renderer 2008 renders the regions of flat pixels described by the edge pairs into the Uncompressed memory 207. It will be appreciated that the flat pixel regions are painted over the image pixels, thereby painting over any pixels modified by backfilling during the image compression process. In doing so the sharp edges of flat pixel regions are preserved.

Second Embodiment

Improved Image Compression

Tiles that contain a mixture of flat pixels and image pixels in a manner causing Compression Path Type 5 to be used (i.e. hybrid tiles for which the palette has overflowed) are further processed in an alternative embodiment to optimise both speed and quality. This is achieved by using data provided by the bitmask. If the bitmask contains some "false" values, then there are some non-image pixels that do not need to be compressed using the Image Processor 416 and can therefore be either ignored or overwritten to make the task of the Image Processor 416 easier.

Figure 19A:
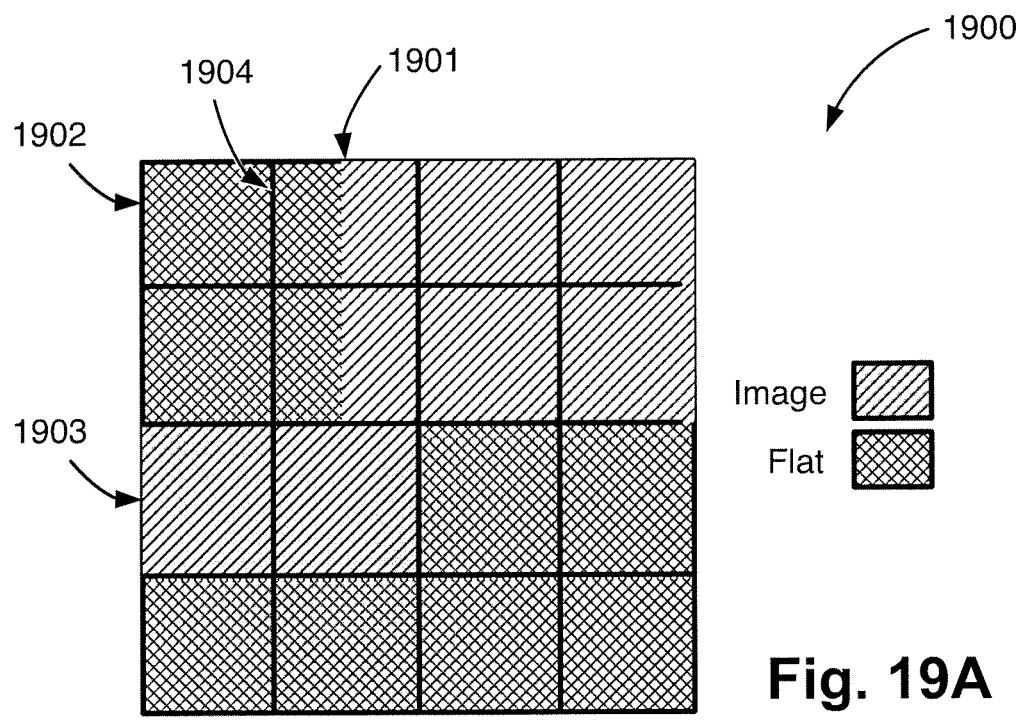
FIG. 19A illustrates a tile, divided into 8 by 8 pixel blocks where there is a mixture of flat and image regions.

FIG. 19A shows a typical 32 by 32 pixel tile 1900 that contains both image and flat fill data. The overlaid grid 1904 further divides the tile into blocks containing 8×8 pixels. This is typical of the dimensions of a pixel block passed to a lossy image compressor such as JPEG for example. The image processor 416 accepts both bitmap data and bitmask data. In the alternative arrangement the image processor 416 pre-processes the image mask for the tile to determine the type of data contained within each block of the tile. Block 1902 is an 8 by 8 block where all the pixels belong to one or more flat regions. The corresponding bits in the bitmask for this 8×8 block 1902 are all marked 'false' indicating that the data is flat fill and that pixels within this 8×8 block have already been compressed by the edge processor 404. Therefore this flat fill data need not be passed to the image processor 416. Since image compression is a computationally expensive process any saving will lead to an overall increase in tile processing speed.

Figure 19B:
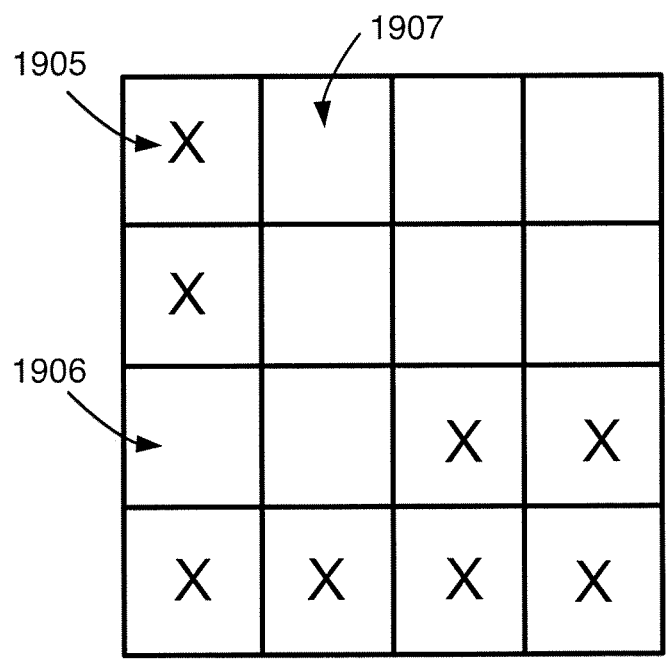
FIG. 19B illustrates 8 by 8 pixel blocks that contain all flat data marked as "skip"

Referring to FIG. 19B the 8 by 8 block 1902, after pre-processing, has been marked as 'skip' 1905. Block 1903 of FIG. 19A is an 8×8 block where all the pixel data is marked as image pixels. The corresponding bits in the bitmask for this 8 by 8 block 1903 are all marked 'true' indicating that the pixels are image pixels and the block 1903 therefore needs to be compressed by the Image Compressor 418. The 8 by 8 block 1903, after pre-processing, has not been marked as 'skip' 1906 and the corresponding pixel data will be passed through to the Image Compressor 418.

Block 1901 of FIG. 19A is a 8 by 8 block where there is a mixture of image pixels and pixels belonging to flat regions. The corresponding bits in the bitmask would be a mixture of 'true' and 'false' values corresponding to where the image pixels and flat pixels are located within the 8 by 8 block. Since the 8 by 8 block 1901 contains image pixels the entire 8×8 block needs to be passed to the Image Compressor 418.

8 by 8 blocks marked as 'skip' need to be encoded within the compressed output bitstream for the block in such a way that the decompressor can recognise them. Such blocks are preferably encoded by adding a single 'skip' symbol to the Huffman code for DC coefficients.

Decompression speed is also improved. Decoding 'skip' symbols is a simple lookup operation; once a block is decoded as 'skip' it can be passed over in future processing steps.

The example image pixels passed to the image compressor 418 for 8 by 8 block 1901 contain a sharp edge where flat pixels are adjacent to image pixels. In an image compression algorithm such as JPEG, these sharp edges usually result in larger file sizes due to the increased magnitude of high frequency data. Sharp edges also cause visible artefacts known as "ringing". Since the flat pixels contained in 8×8 block 1901 will be painted over by data coded from the lossless edge processor 404 during decompression it is convenient to use 'backfilling' to minimise both file size and visible artefacts for this 8 by 8 block. For example, only the image pixels as indicated by the bitmask need to be preserved, while all other pixels within the 8×8 block can be modified since their values are encoded elsewhere. Non-image pixel values within the 8 by 8 block may be backfilled based on the colour values of neighbouring image pixels, as needed to the edges of the block overwriting any flat pixels. This backfilling is done to reduce the effects of the sharp edges that usually occur within mixed blocks of pixels such as block 1901. Other methods of backfilling can also be utilised.

The foregoing describes only some embodiments of the present invention, and modifications and/or changes can be made thereto without departing from the scope and spirit of the invention, the embodiments being illustrative and not restrictive.

We claim:

1. A method of compressing a color image, said method comprising:
    receiving the color image derived from a page description language, the color image comprising at least one image tile, data of the tile defining: (i) positions of boundaries of a region within the image tile, the region comprising pixels of substantially identical color, wherein the region extends over a plurality of scanlines of the image tile; and (ii) a fill color for the region;
    assessing a visual significance metric of the region based on a length of the region and a width of the region;
    determining whether or not a color palette buffer has overflowed, the color palette buffer storing an indexed array of unique color values that are used within the tile;
    selecting a compression path type for the tile based on the visual significance metric of the region and the determination of whether or not the color palette buffer has overflowed;
    and
    compressing the tile using the selected compression path type.

2. The method of claim 1, wherein the compression path type includes a pixel-based encoding of the one or more image pixels which is a set of indices to the palette in tile raster order.

3. The method of claim 1, wherein the palette has a maximum predetermined size.

4. The method of claim 1, wherein the compression path type includes the pixel-based encoding of the one or more image pixels comprising a set of raw color values in tile raster order.

5. The method of claim 1, wherein the compression of the encoded image pixels is lossy.

6. The method of claim 5, further comprising partitioning the lossy compressed image pixels into one or more elements of differing visual significance.

7. The method of claim 6, further comprising notionally linking elements of the same visual significance from a plurality of the tiles to form partitions of uniform visual significance.

8. The method of claim 5, further comprising, before the compressing, backfilling a selected pixel value from the image into a pixel of the region.

9. The method of claim 5, wherein the tile comprises a plurality of blocks, further comprising determining whether all the pixels within one block belong to the region, and if so, encoding the one block using a predetermined skip symbol.

10. The method of claim 9, further comprising, if at least one pixel within the block does not belong to the region, backfilling the at least one pixel with a value from the image pixels within the block, before the compressing.

11. The method of claim 1 wherein, the data defining boundaries of the region comprises an edge pair, the edges of the pair defining left hand and right hand boundaries of the region.

12. The method of claim 1, further comprising:
    discarding the boundary data and the fill colour color for the region if the visual significance metric of the boundary data is below a threshold.

13. The method of claim 1, wherein:
    the palette comprises distinct colors within the tile, and a palette map of palette indices of pixel values of the tile, and
    where a compressed size for the tile is greater than the encoded size of the palette and the palette map, the region data is discarded and the tile is compressed using the palette and the palette map.

14. The method of claim 1, wherein the color image includes three or more different pixel values.

15. An apparatus for compressing a color image, the apparatus comprising:
    a memory for storing a program; and
    a processor for executing the program, the program comprising:
    code for receiving the color image derived from a page description language, the color image comprising at least one image tile, data of the tile defining: (i) positions of boundaries of a region within the image tile, the region comprising pixels of substantially identical color and extending over a plurality of scanlines of the image tile; and (ii) a fill color for the region;
    code for assessing a visual significance metric of the region based on a length of the region and a width of the region;

code for determining whether or not a color palette buffer has overflowed, the color palette buffer storing an indexed array of unique color values that are used within the tile;

code for selecting a compression path type for the tile based on the visual significance metric of the region and the determination of whether or not the color palette buffer has overflowed; and code for compressing the tile using the determined compression path type.

16. A non-transitory computer readable storage medium having recorded thereon a computer program for directing a processor to execute a method for compressing a color image, the program comprising:

code for receiving the color image derived from a page description language, the color image comprising at least one image tile, data of the image tile defining: (i) positions of boundaries of the region within the image tile, the region comprising pixels of substantially identical color and extending over a plurality of scanlines of the image tile; and (ii) a fill color for the region;

code for assessing a visual significance metric of the region based on a length of the region and a width of the region;

code for determining whether or not a color palette buffer has overflowed, the color palette buffer storing an indexed array of unique color values that are used within the tile;

code for selecting a compression path type for the tile based on the visual significance metric of the region and the determination of whether or not the color palette buffer has overflowed; and code for compressing the tile using the determined compression path type.

* * * * *